United States Patent
Hayashi

(10) Patent No.: US 8,045,809 B2
(45) Date of Patent: Oct. 25, 2011

(54) IMAGE FORMING APPARATUS

(75) Inventor: Koji Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1153 days.

(21) Appl. No.: 11/751,827

(22) Filed: May 22, 2007

(65) Prior Publication Data

US 2007/0273929 A1 Nov. 29, 2007

(30) Foreign Application Priority Data

May 26, 2006 (JP) ................................. 2006-146969

(51) Int. Cl.
*G06K 9/36* (2006.01)

(52) U.S. Cl. ........ 382/232; 382/252; 382/100; 382/169; 382/248; 382/276; 358/3.13

(58) Field of Classification Search .................. 382/232, 382/252, 100, 169, 248, 276; 358/3.28, 3.01, 358/534, 1.9, 3.03, 3.13; 345/87
See application file for complete search history.

(56) References Cited

U.S. PATENT DOCUMENTS

| | | | |
|---|---|---|---|
| 6,108,450 A | | 8/2000 | Ueda |
| 6,826,290 B1 * | 11/2004 | Murakami et al. ............. 382/100 |
| 7,130,083 B1 * | 10/2006 | Konno et al. ................. 358/3.06 |
| 7,298,525 B2 * | 11/2007 | Hagai et al. .................... 358/1.9 |
| 2004/0218221 A1 * | 11/2004 | Hirano et al. ................. 358/3.06 |
| 2005/0195438 A1 * | 9/2005 | Couwenhoven et al. .... 358/3.05 |

FOREIGN PATENT DOCUMENTS

| | | |
|---|---|---|
| JP | 10-150564 A | 6/1998 |
| JP | 2003-274173 | 9/2003 |
| JP | 2003-319179 | 11/2003 |
| JP | 2004-48194 A | 2/2004 |
| JP | 2004-048194 | * 12/2004 |
| JP | 2005-39483 | 2/2005 |
| JP | 3740721 | 11/2005 |

OTHER PUBLICATIONS

Japanese Office Action issued on Jan. 18, 2011 in corresponding Japanese Application No. 2006-146969.

* cited by examiner

*Primary Examiner* — Samir Ahmed
*Assistant Examiner* — Ali Bayat
(74) *Attorney, Agent, or Firm* — Oblon, Spivak, McClelland, Maier & Neustadt, L.L.P.

(57) ABSTRACT

In an image forming apparatus includes a quantization threshold value to convert input image data of an N value to output image data of an M value based on random dither processing. A flag to designate addition of a non-periodic component to a quantization threshold value can be set for each quantization threshold value and a threshold value that has a non-periodic component is added to the quantization threshold value based on a relation between a large and a small quantization threshold value in different threshold value levels with respect to any target pixel in the quantization threshold value.

9 Claims, 33 Drawing Sheets

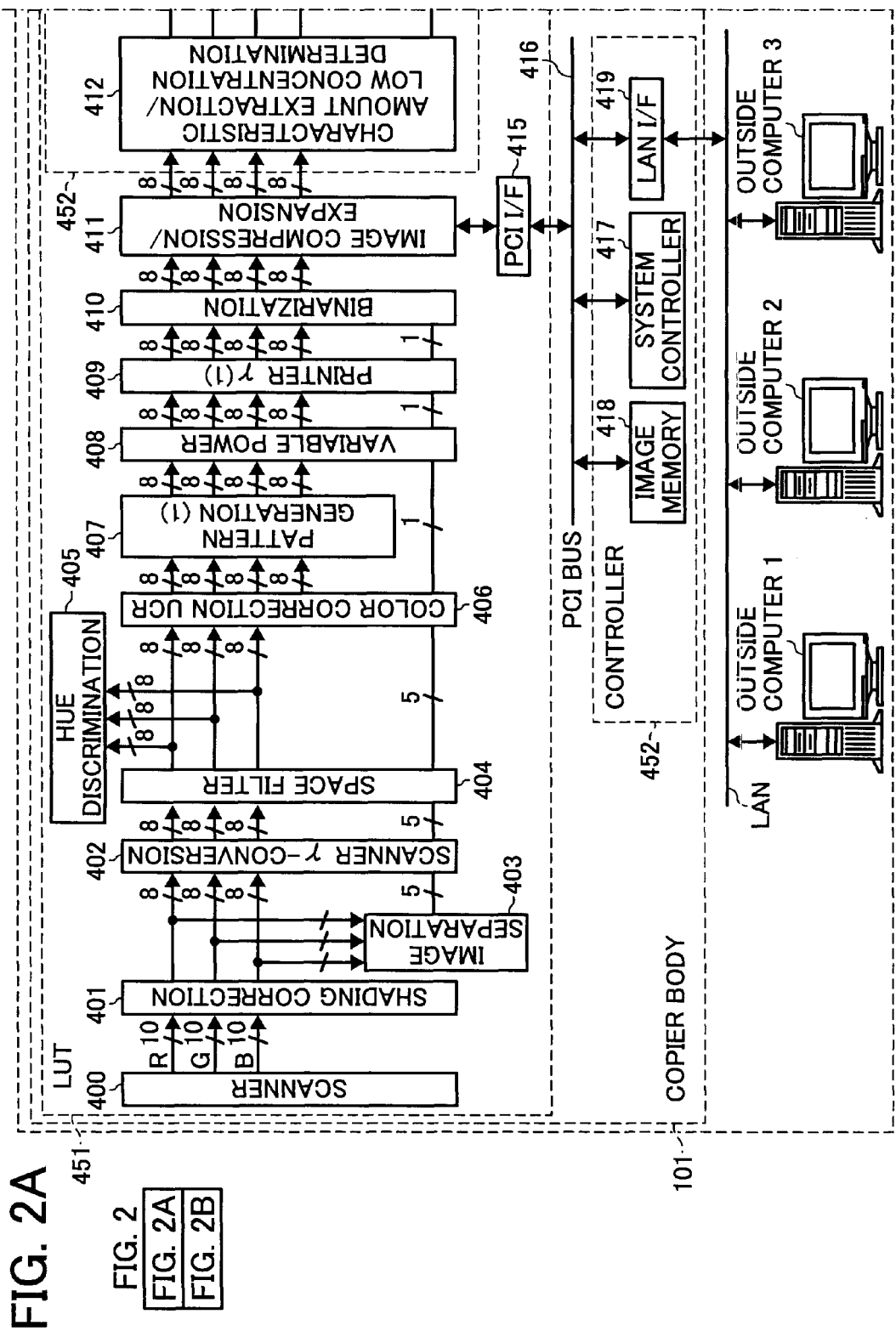

FIG. 5A

| 0 | 1 | 2 | 1 | 0 |
|---|---|---|---|---|
| 1 | 2 | 4 | 2 | 1 |
| 0 | 1 | 2 | 1 | 0 |

EXAMPLE OF SMOOTHING FILTER

FIG. 5B

| 0 | −1 | 0 |
|---|---|---|
| −1 | 4 | −1 |
| 0 | −1 | 0 |

EXAMPLE OF LAPLACIAN FILTER

FIG. 6A

| 1  | 1  | 1  | 1  | 1  |
|----|----|----|----|----|
| 1  | 1  | 1  | 1  | 1  |
| 0  | 0  | 0  | 0  | 0  |
| -1 | -1 | -1 | -1 | -1 |
| -1 | -1 | -1 | -1 | -1 |

ONE EXAMPLE OF SUB-SCANNING DIRECTION EDGE DETECTION FILTER

FIG. 6B

| 1 | 1 | 0 | -1 | -1 |
|---|---|---|----|----|
| 1 | 1 | 0 | -1 | -1 |
| 1 | 1 | 0 | -1 | -1 |
| 1 | 1 | 0 | -1 | -1 |
| 1 | 1 | 0 | -1 | -1 |

ONE EXAMPLE OF MAIN SCANNING DIRECTION EDGE DETECTION FILTER

FIG. 6C

| 0  | 1  | 1  | 1 | 1 |
|----|----|----|---|---|
| 1  | 0  | 1  | 1 | 1 |
| -1 | 0  | 0  | 1 | 1 |
| -1 | -1 | -1 | 0 | 1 |
| -1 | -1 | -1 | -1 | -1 |

ONE EXAMPLE OF OBLIQUE DIRECTION EDGE DETECTION FILTER

FIG. 6D

| 1 | 1  | 1  | 1  | 0  |
|---|----|----|----|----|
| 1 | 1  | 1  | 0  | -1 |
| 1 | 1  | 0  | 0  | -1 |
| 1 | 0  | -1 | -1 | -1 |
| 0 | -1 | -1 | -1 | -1 |

ANOTHER EXAMPLE OF OBLIQUE DIRECTION EDGE DETECTION FILTER

FIG. 6E

| 1 | 2 | 1 | ×(1/4)

ONE EXAMPLE OF COEFFICIENT OF SMOOTHING FILTER 1104

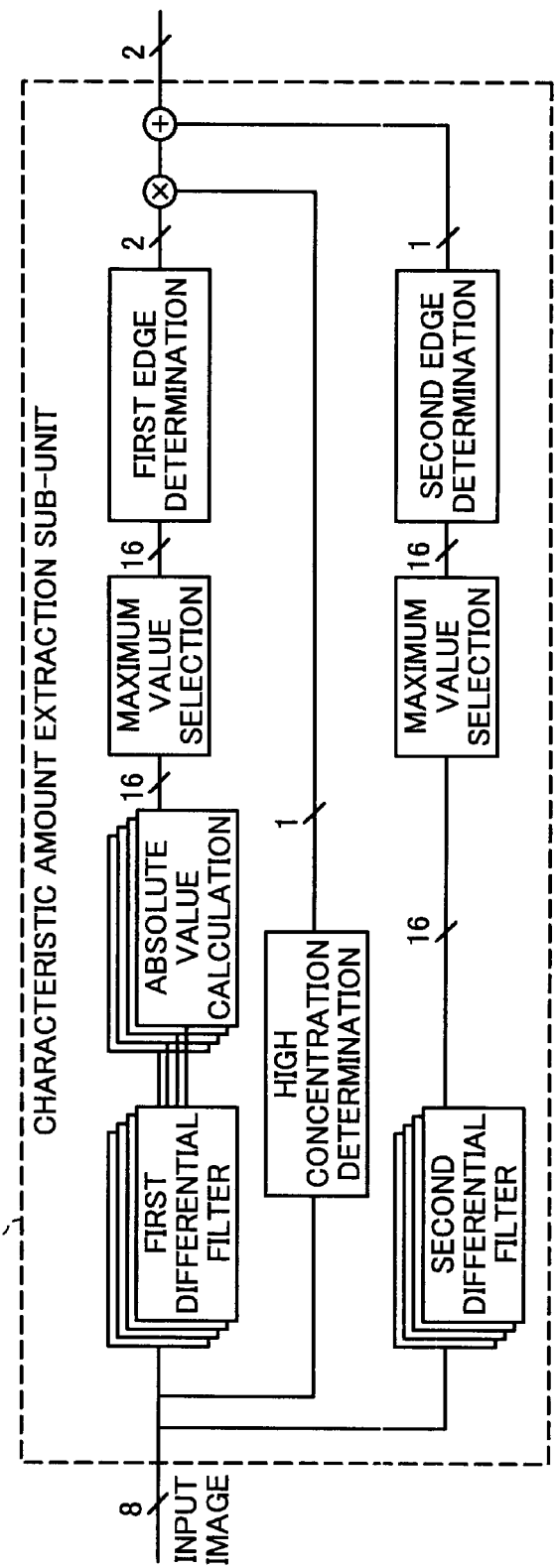

FIG. 16A

| -1 | -1 | 0 | 1 | 1 |
|----|----|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIRST DIFFERENTIAL
FILTER 1 OF 5×5

FIG. 16B

| -1 | -1 | -1 | -1 | -1 |
|----|----|----|----|----|
| -1 | -1 | -1 | -1 | -1 |
| 0  | 0  | 0  | 0  | 0  |
| 1  | 1  | 1  | 1  | 1  |
| 1  | 1  | 1  | 1  | 1  |

FIRST DIFFERENTIAL
FILTER 2 OF 5×5

FIG. 16C

| -1 | -1 | -1 | -1 | 0 |
|----|----|----|----|---|
| -1 | -1 | -1 | 0  | 1 |
| -1 | -1 | 0  | 1  | 1 |
| -1 | 0  | 1  | 1  | 1 |
| 0  | 1  | 1  | 1  | 1 |

FIRST DIFFERENTIAL
FILTER 3 OF 5×5

FIG. 16D

| 0 | -1 | -1 | -1 | -1 |
|---|----|----|----|----|
| 1 | 0  | -1 | -1 | -1 |
| 1 | 1  | 0  | -1 | -1 |
| 1 | 1  | 1  | 0  | -1 |
| 1 | 1  | 1  | 1  | 0  |

FIRST DIFFERENTIAL
FILTER 4 OF 5×5

FIG. 17A

| 0 | 0 | -1 | 0 | 0 |
|---|---|---|---|---|
| 0 | -1 | -2 | -1 | 0 |
| 0 | 1 | 8 | 1 | 0 |
| 0 | -1 | -2 | -1 | 0 |
| 0 | 0 | -1 | 0 | 0 |

SECOND DIFFERENTIAL
FILTER 1 OF 5×5

FIG. 17B

| 0 | 0 | 0 | 0 | 0 |
|---|---|---|---|---|
| 0 | -1 | 1 | -1 | 0 |
| -1 | -2 | 8 | -2 | -1 |
| 0 | -1 | 1 | -1 | 0 |
| 0 | 0 | 0 | 0 | 0 |

SECOND DIFFERENTIAL
FILTER 2 OF 5×5

FIG. 17C

| -1 | 0 | 0 | 0 | 0 |
|---|---|---|---|---|
| 0 | -2 | -1 | 1 | 0 |
| 0 | -1 | 8 | -1 | 0 |
| 0 | 1 | -1 | -2 | 0 |
| 0 | 0 | 0 | 0 | -1 |

SECOND DIFFERENTIAL
FILTER 3 OF 5×5

FIG. 17D

| 0 | 0 | 0 | 0 | -1 |
|---|---|---|---|---|
| 0 | 1 | -1 | -2 | 0 |
| 0 | -1 | 8 | -1 | 0 |
| 0 | -2 | -1 | 1 | 0 |
| -1 | 0 | 0 | 0 | 0 |

SECOND DIFFERENTIAL
FILTER 4 OF 5×5

FIG. 18

Thr [0, 3][x, y, 0]

| 36 | 126 | 176 | 8 | 48 | 208 | 112 |
|---|---|---|---|---|---|---|
| 48 | 208 | 112 | 36 | 128 | 176 | 8 |
| 128 | 176 | 8 | 48 | 208 | 112 | 36 |
| 208 | 112 | 36 | 128 | 176 | 8 | 48 |
| 176 | 8 | 48 | 208 | 112 | 36 | 128 |
| 112 | 36 | 128 | 176 | 8 | 48 | 208 |
| 8 | 48 | 208 | 112 | 36 | 128 | 176 |

↓ SUB-SCANNING DIRECTION y

→ MAIN SCANNING DIRECTION x

EXAMPLE OF 7×7 QUANTIZATION THRESHOLD VALUE (NO.1)

FIG. 19

Thr [0, 3][x, y, 4]

| 48 | 136 | 192 | 8 | 56 | 216 | 128 |
|---|---|---|---|---|---|---|
| 56 | 216 | 128 | 48 | 136 | 192 | 8 |
| 136 | 192 | 8 | 56 | 216 | 128 | 48 |
| 216 | 128 | 48 | 136 | 192 | 8 | 56 |
| 184 | 8 | 56 | 216 | 128 | 48 | 136 |
| 128 | 48 | 136 | 192 | 8 | 56 | 216 |
| 8 | 56 | 216 | 128 | 48 | 136 | 192 |

↓ SUB-SCANNING DIRECTION y

→ MAIN SCANNING DIRECTION x

EXAMPLE OF 7×7 QUANTIZATION THRESHOLD VALUE (NO.2)

FIG. 20

Thr [0, 3][x, y, 5]

| 48 | 144 | 192 | 16 | 64 | 224 | 136 |
|---|---|---|---|---|---|---|
| 64 | 224 | 136 | 48 | 144 | 192 | 16 |
| 144 | 192 | 16 | 64 | 224 | 136 | 48 |
| 224 | 136 | 48 | 144 | 192 | 16 | 64 |
| 192 | 16 | 64 | 224 | 136 | 64 | 146 |
| 136 | 48 | 144 | 192 | 16 | 64 | 224 |
| 16 | 64 | 224 | 136 | 48 | 144 | 192 |

↓ SUB-SCANNING DIRECTION y

→ MAIN SCANNING DIRECTION x

EXAMPLE OF 7×7 QUANTIZATION THRESHOLD VALUE (NO.3)

FIG. 21

Bn [0, 3][x, y, i]
(i≠4, 5 AND 0≦i≦14)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

↓ SUB-SCANNING DIRECTION y

→ MAIN SCANNING DIRECTION x

EXAMPLE OF 7×7 BLUE NOISE ADDING SELECTION FLAG (NO.1)

| 0 | 0 | 0 | 1 | 0 | 0 | 0 |
|---|---|---|---|---|---|---|
| 0 | 0 | 0 | 0 | 0 | 0 | 1 |
| 0 | 0 | 1 | 0 | 0 | 0 | 0 |
| 0 | 0 | 0 | 0 | 0 | 1 | 0 |
| 0 | 1 | 0 | 0 | 0 | 0 | 0 |
| 0 | 0 | 0 | 1 | 0 | 0 | 0 |
| 1 | 0 | 0 | 0 | 0 | 0 | 0 |

↓ SUB-SCANNING DIRECTION y

→ MAIN SCANNING DIRECTION x

EXAMPLE OF 7×7 BLUE NOISE ADDING SELECTION FLAG (NO.2)

FIG. 23

Thr [0, 3][x, y, 0]

| 32 | 32 | 32 | 32 | 32 | 32 | 32 |
|----|----|----|----|----|----|----|
| 32 | 32 | 32 | 32 | 32 | 32 | 32 |
| 32 | 32 | 32 | 32 | 32 | 32 | 32 |
| 32 | 32 | 32 | 32 | 32 | 32 | 32 |
| 32 | 32 | 32 | 32 | 32 | 32 | 32 |
| 32 | 32 | 32 | 32 | 32 | 32 | 32 |
| 32 | 32 | 32 | 32 | 32 | 32 | 32 |

↓ SUB-SCANNING DIRECTION y

→ MAIN SCANNING DIRECTION x

EXAMPLE OF 7×7 QUANTIZATION THRESHOLD VALUE (NO.3)

| 48 | 48 | 48 | 48 | 48 | 48 | 48 |
|---|---|---|---|---|---|---|
| 48 | 48 | 48 | 48 | 48 | 48 | 48 |
| 48 | 48 | 48 | 48 | 48 | 48 | 48 |
| 48 | 48 | 48 | 48 | 48 | 48 | 48 |
| 48 | 48 | 48 | 48 | 48 | 48 | 48 |
| 48 | 48 | 48 | 48 | 48 | 48 | 48 |
| 48 | 48 | 48 | 48 | 48 | 48 | 48 |

↓ SUB-SCANNING DIRECTION y

→ MAIN SCANNING DIRECTION x

EXAMPLE OF 7×7 QUANTIZATION THRESHOLD VALUE (NO.4)

FIG. 25

Thr [0, 3][x, y, 5]

| 64 | 64 | 64 | 64 | 64 | 64 | 64 |
|---|---|---|---|---|---|---|
| 64 | 64 | 64 | 64 | 64 | 64 | 64 |
| 64 | 64 | 64 | 64 | 64 | 64 | 64 |
| 64 | 64 | 64 | 64 | 64 | 64 | 64 |
| 64 | 64 | 64 | 64 | 64 | 64 | 64 |
| 64 | 64 | 64 | 64 | 64 | 64 | 64 |
| 64 | 64 | 64 | 64 | 64 | 64 | 64 |

↓ SUB-SCANNING DIRECTION y

→ MAIN SCANNING DIRECTION x

EXAMPLE OF 7×7 QUANTIZATION THRESHOLD VALUE (NO.5)

FIG. 26

Thr [0, 3][x, y, i] (6≦i≦14)

| 16×(i−1) | 16×(i−1) | 16×(i−1) | 16×(i−1) | 16×(i−1) | 16×(i−1) | 16×(i−1) |
|---|---|---|---|---|---|---|
| 16×(i−1) | 16×(i−1) | 16×(i−1) | 16×(i−1) | 16×(i−1) | 16×(i−1) | 16×(i−1) |
| 16×(i−1) | 16×(i−1) | 16×(i−1) | 16×(i−1) | 16×(i−1) | 16×(i−1) | 16×(i−1) |
| 16×(i−1) | 16×(i−1) | 16×(i−1) | 16×(i−1) | 16×(i−1) | 16×(i−1) | 16×(i−1) |
| 16×(i−1) | 16×(i−1) | 16×(i−1) | 16×(i−1) | 16×(i−1) | 16×(i−1) | 16×(i−1) |
| 16×(i−1) | 16×(i−1) | 16×(i−1) | 16×(i−1) | 16×(i−1) | 16×(i−1) | 16×(i−1) |
| 16×(i−1) | 16×(i−1) | 16×(i−1) | 16×(i−1) | 16×(i−1) | 16×(i−1) | 16×(i−1) |

↓ SUB-SCANNING DIRECTION y

→ MAIN SCANNING DIRECTION x

EXAMPLE OF 7×7 QUANTIZATION THRESHOLD VALUE (NO. 6)

FIG. 27

Bn [3, 3][x, y, i]
(i≠0, 4, 5 AND 0≦i≦14)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

↓ SUB-SCANNING DIRECTION y

→ MAIN SCANNING DIRECTION x

EXAMPLE OF 7×7 BLUE NOISE ADDING SELECTION FLAG (NO. 3)

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

↓ SUB-SCANNING DIRECTION y

→ MAIN SCANNING DIRECTION x

EXAMPLE OF 7×7 BLUE NOISE ADDING SELECTION FLAG (NO. 4)

FIG. 29

Thr [3, D][x, y, i](D=0 AND i≦5)

| 8 | 8 | 8 | 8 | 8 | 8 | 8 |
|---|---|---|---|---|---|---|
| 8 | 8 | 8 | 8 | 8 | 8 | 8 |
| 8 | 8 | 8 | 8 | 8 | 8 | 8 |
| 8 | 8 | 8 | 8 | 8 | 8 | 8 |
| 8 | 8 | 8 | 8 | 8 | 8 | 8 |
| 8 | 8 | 8 | 8 | 8 | 8 | 8 |
| 8 | 8 | 8 | 8 | 8 | 8 | 8 |

↓ SUB-SCANNING DIRECTION y

→ MAIN SCANNING DIRECTION x

EXAMPLE OF 7×7 QUANTIZATION THRESHOLD VALUE (NO. 6)

FIG. 30

Thr [3, D][x, y, i](D=0 AND i≧6)

| 255 | 255 | 255 | 255 | 255 | 255 | 255 |
|---|---|---|---|---|---|---|
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |

↓ SUB-SCANNING DIRECTION y

→ MAIN SCANNING DIRECTION x

EXAMPLE OF 7×7 QUANTIZATION THRESHOLD VALUE (NO. 7)

AREA PROCESS CLEAR

AREA EDIT
SET CONTENTS OF AREA EDIT        CLEAR AND CLOSE    CLOSE

| CREATE | IMAGE QUALITY | COLOR PROCESS | COLOR BALANCE |

IMAGE QUALITY CONTROL

| | | | | | |
|---|---|---|---|---|---|
| SHARP/SOFT | SHARP | SLIGHTLY SHARP | MEDIUM | SLIGHTLY SOFT | SOFT |
| SURFACE CONCENTRATION CONTROL | SPARSE | SLIGHTLY SPARSE | MEDIUM | SLIGHTLY DENSE | DENSE |
| UCR CONTROL | SPARSE | SLIGHTLY SPARSE | MEDIUM | SLIGHTLY DENSE | DENSE |
| TEXTURE REMOVAL | STRONG | SLIGHTLY STRONG | MEDIUM | SLIGHTLY SMOOTH | SMOOTH |

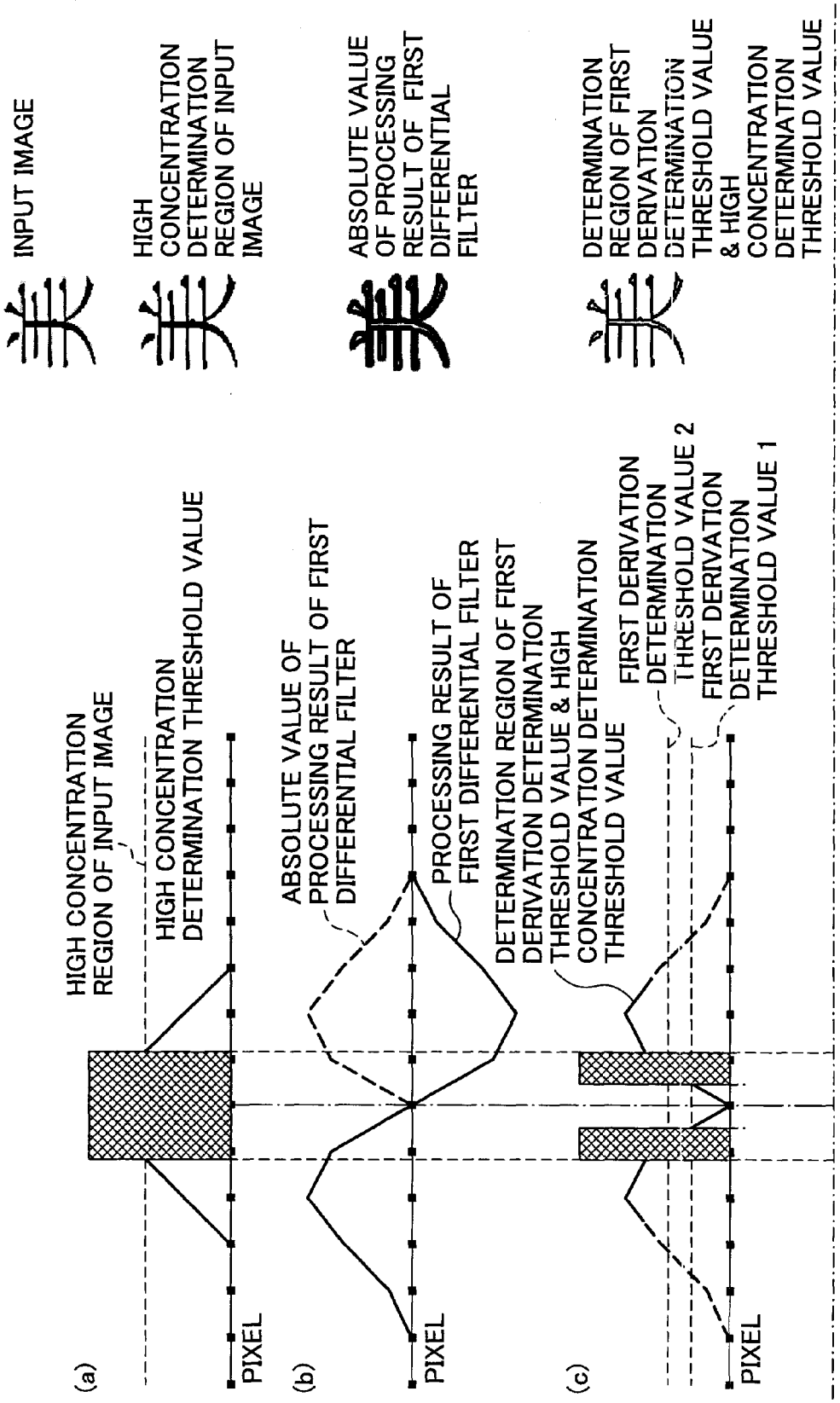

WHITE CORRECTION/BLACK CORRECTION

IMAGE FORMING APPARATUS

CROSS-REFERENCE TO RELATED APPLICATIONS

The present document incorporates by reference the entire contents of Japanese priority document, 2006-146969, filed in Japan on May 26, 2006.

BACKGROUND OF THE INVENTION

1. Field of the Invention

The present invention generally relates to an image forming apparatus that employs multilevel random dither processing.

2. Description of the Related Art

When gradation processing based on a random dither method is performed to image data in general, texture that is not present on a document image (data) occurs, which leads to an undesirable image.

One approach is to add a threshold value having a non-periodic component to prevent occurrence of such texture. Such a technique is disclosed, for example, in Japanese Patent Application Laid-open No. H9-93446.

When such a threshold value is added, however, graininess or a feeling of graininess and a feeling of being uneven may disadvantageously appear on an image.

SUMMARY OF THE INVENTION

It is an object of the present invention to at least partially solve the problems in the conventional technology.

According to an aspect of the present invention, an image forming apparatus includes a random dither processing unit that performs random dither processing of converting input N-values image data to M-values image data; a flag setting unit that sets a flag that designates an addition of a non-periodic component to each of the quantization threshold values; and a threshold-value adding unit that adds a non-periodic component to the quantization threshold values based on a magnitude of the quantization threshold value in different threshold value levels with respect to a target pixel in the quantization threshold value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a schematic view of an exemplary smoothing filter;

FIG. 5B is a schematic view of an exemplary Laplacian filter;

FIGS. 6A to 6E are schematic views of edge detection filters as an example;

FIG. 14 is a schematic view of a random dither matrix as an example;

FIG. 15 is a block diagram of characteristic amount extraction 4122;

FIGS. 16A to 16D are schematic views of exemplary differential filters 1 to 4 of first derivation 5×5;

FIGS. 17A to 17D are schematic views of exemplary differential filters 1 to 4 of second derivation 5×5;

FIG. 18 is an exemplary schematic view of a non-edge (a photograph portion) quantization threshold value of 7×7 ((pixels in a main scanning direction)×(pixels in a sub-scanning direction));

FIG. 19 is another exemplary schematic view of a non-edge (a photograph portion) quantization threshold value of 7×7 ((pixels in the main scanning direction)×(pixels in the sub-scanning direction));

FIG. 20 is still another exemplary schematic view of a non-edge (a photograph portion) quantization threshold value of 7×7 ((pixels in the main scanning direction)×(pixels in the sub-scanning direction));

FIG. 21 is an exemplary schematic view of a blue noise adding selection flag;

FIG. 22 is another exemplary schematic view of a blue noise adding selection flag;

FIG. 23 is a schematic view for explaining a first example of a quantization threshold value of 7×7 ((pixels in the main scanning direction)×(pixels in the sub-scanning direction)) for a high concentration portion (D=3) of an edge portion (C=3);

FIG. 24 is a schematic view for explaining a second example of a quantization threshold value of 7×7 ((pixels in the main scanning direction)×(pixels in the sub-scanning direction)) for a high concentration portion (D=3) of an edge portion (C=3);

FIG. 25 is a schematic view for explaining a third example of a quantization threshold value of 7×7 ((pixels in the main scanning direction)×(pixels in the sub-scanning direction)) for a high concentration portion (D=3) of an edge portion (C=3);

FIG. 26 is a schematic view for explaining a fourth example of a quantization threshold value of 7×7 ((pixels in the main scanning direction)×(pixels in the sub-scanning direction)) for a high concentration portion (D=3) of an edge portion (C=3);

FIG. 27 is still another exemplary schematic view of a blue noise adding selection flag;

FIG. 28 is still another exemplary schematic view of a blue noise adding selection flag;

FIG. 29 is an exemplary schematic view of a quantization threshold value when a low concentration determination result D is determined as lowest (D=0);

FIG. 30 is another exemplary schematic view of a quantization threshold value when a low concentration determination result D is determined as lowest (D=0);

FIG. 31 is an exemplary schematic view of an operation screen to select gradation processing;

FIGS. 33A to 33E are schematic views for explaining characteristic amount extraction;

DETAILED DESCRIPTION OF THE PREFERRED EMBODIMENTS

Exemplary embodiments of the present invention are explained below in detail with reference to the accompanying drawings.

Figure 1:
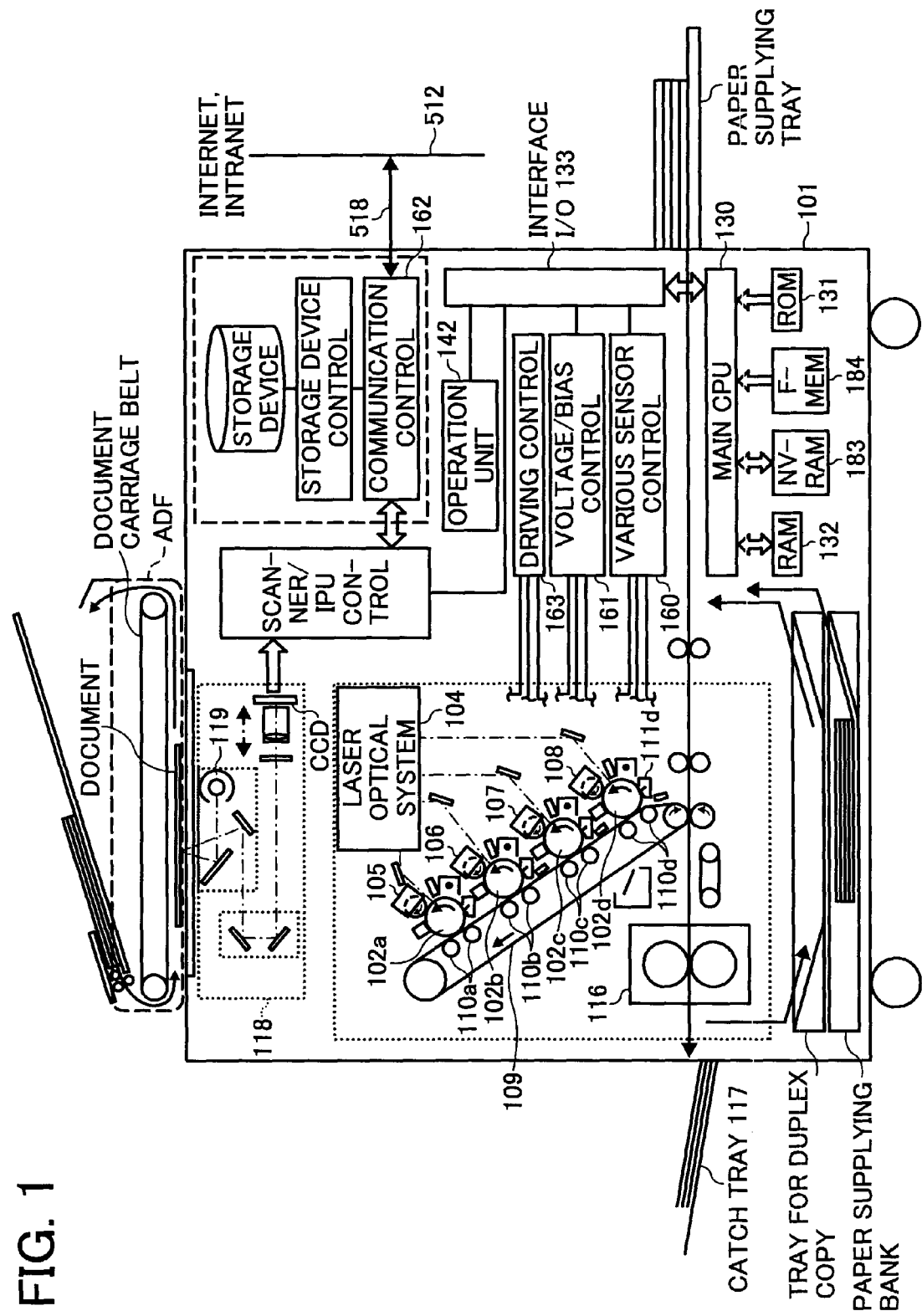
FIG. 1 is a schematic view of a mechanism of a copier body 101 according to a first embodiment of the present invention.

FIG. 1 is a schematic view of an internal structure of a copier body 101 according to a first embodiment of the present invention.

As shown in FIG. 1, an OPC drum 102 of diameter 120 millimeters, which is an image carrier, is located almost at the center of the copier body 101, and various other units are arranged around the OPC drum 102. Specifically, arranged around the OPC drum 102 are a charger 103 that apply an electrical charge to a surface of an organic photo conductor (OPC) drum 102; a laser optical system 104 that irradiates an uniformly charged surface of the OPC drum 102 with semiconductor laser beams to form an electrostatic image; a black developing device 105 that supplies each colored toner to an electrostatic image to develop and provides a toner image for each color; three color developing devices 106, 107, 108, that is to say, yellow Y, magenta M, and cyan C; an intermediate transfer belt 109 on which each of colored toner images formed on the OPC drum 102 is sequentially transferred; bias rollers 110 that apply transfer voltage to the intermediate transfer belt 109; a cleaning device 111 that removes toners left on the surface of the OPC drum 102 after toner images are transferred; and a neutralization device 112 that removes electric charges left on the surface of the OPC drum 102 after toner images are transferred.

A transfer bias roller 113 applies voltage to the intermediate transfer belt 109 when transferring toner images from the intermediate transfer belt 109 to a transfer material. A belt cleaning device 114 cleans residual toner left on the intermediate transfer belt 109 after the toner images are transferred from the intermediate transfer belt 109 to the transfer material.

A carriage belt 115 separates the transfer material, having the toner images thereon, and carries the transfer material toward an outlet for discharging the transfer material outside. A fixing device 116 is arranged near the outlet. The fixing device 116 heats and applies a pressure to the transfer material to fix the toner images on the transfer material. A catch tray 117 is mounted on the outside on the outlet for receiving the discharged transfer material.

A control system incorporated in the copier body 101 is explained. The control system includes a main central processing unit (CPU) 130 to which are connected a read only memory (ROM) 131, an NV-RAM 183, F-MEM 184, and random access memory 132 (RAM). The main CPU 130 is connected to various sensor control 160, voltage/bias control 161, communication control 162, and driving control 163 through an interface I/O 133 and performs control of all the units of the copier body 101 or control of communication with devices arranged outside of the copier body 101.

A detailed explanation is given about the various sensor control 160, voltage/bias control 161, communication control 162, and driving control 163. A laser optical system control unit, a power supply circuit, optical sensors, a toner concentration sensor, an environment sensor, a photoconductor surface potential sensor, a toner replenishment circuit, an intermediate transfer belt driving unit, and an operation unit 142 are connected respectively.

The laser optical system control unit controls laser output from a laser optical system 104. The power supply circuit applies predetermined discharge voltage for charging to the charger 103, supplies a predetermined developing bias voltage to the developing devices 105, 106, 107, 108, and applies a predetermined transfer voltage to the bias roller 110 and the transfer bias roller 113.

The optical sensors mean the optical sensor that is opposed to the photo conductor drum 102 and that detects an amount of toner attached to the photo conductor drum 102, the optical sensor that is opposed to the transfer belt 109 and that detects an amount of toner attached to the transfer belt 109, and the optical sensor that is opposed to the carriage belt 115 and that detects an amount of toner attached to the carriage belt 115, as shown. The detection can be performed at any one of the optical sensors in practice.

A contact glass as a document platform that is located at the upper part of the copier body 101 and an exposing lamp 119 (a halogen lamp) that irradiates a document on the contact glass 118 with scanning light beams are arranged above the laser optical system 104. Light beams reflected from a document are directed to an imaging lens 122 through a reflection mirror 121 and are entered in an image sensor array 123 of charge coupled device (CCD) as a photoelectric conversion element. Image signals converted to electric signals in the image sensor array of the CCD control laser oscillation from a semiconductor laser in the laser optical system 104 through an image processing apparatus (not shown).

The optical sensor includes a light-emitting element such as a light-emitting diode and a light-receiving element such as a photosensor that are located adjacently to a region after the photo conductor drum 102 is used for transferring. The optical sensor senses an amount of toner attached to a toner image of a sense pattern latent image formed on the photo conductor drum 102 and an amount of toner attached to a surface of the photo conductor drum for each color and residual potential after removing electricity from a photo conductor.

The optical sensor passes the sensed signals to a photoelectric sensor control unit (not shown). The photoelectric sensor control unit calculates a ratio of an amount of toner attached to sense pattern toner images and an amount of toner attached to the surface of the photo conductor drum, senses a variation in image concentration based on comparison of the calculated ratio and a reference value, and adjusts a control value in the toner concentration sensor so that the calculated ratio is equal to the reference value.

The toner concentration sensor senses toner concentration based on changing magnetic permeability of a developer that is present in the developing devices 105 to 108. The toner concentration sensor compares the sensed toner concentration value to a reference value and, when the toner concentration is below a certain value to cause lack of toner, applies toner replenishment signals enough to support the lacked toner to the toner replenishment circuit 140.

The potential sensor senses surface potential of the photo conductor drum 102 as an image carrier and the intermediate transfer belt driving unit controls driving the intermediate transfer belt.

The black developing device 105 includes a developer that has black toner and a carrier. The developer is stirred by rotation of an agent stirring member and the amount of developer that is taken up on a developing sleeve by a developer controlling member is controlled. The supplied developer is magnetically carried on the developing sleeve, while it rotates in a rotation direction of the developing sleeve as a magnetic brush.

Figure 3:
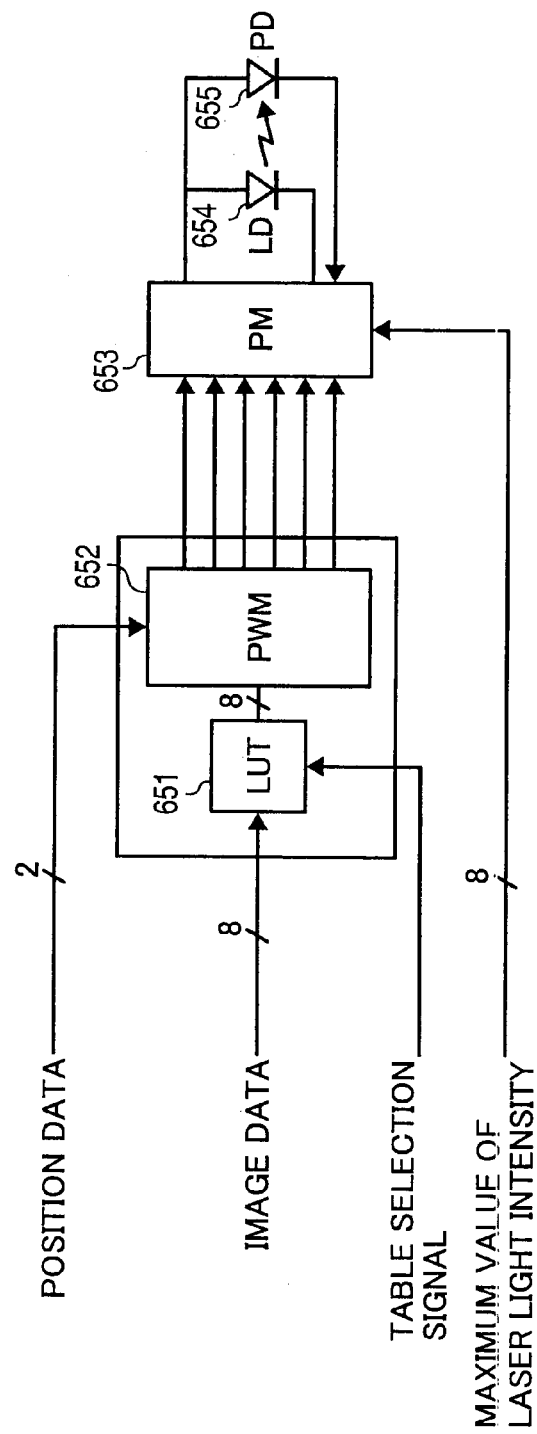
FIG. 3 is a flowchart for explaining image processing.

FIG. 3 is a block diagram for explaining laser modulation processing. The writing frequency is 18.6 megahertz and a scanning time of a pixel is 53.8 nanoseconds. 8-bit image data can receive γ-conversion on a look up table (LUT) 651.

A conversion to an 8-value pulse width is performed based on the higher order 3 bits of an 8-bit image signal in pulse width modulation processing (PWM) 652. A 32-value power modulation is carried out in the lower order 5 bits in the power modulation (PM) processing 653. A laser diode (LD) 654 emits light based on the modulated signal. Emission intensity is monitored by a photo detector (PD) 655 and its correction is performed for each dot. A maximum value of laser light intensity can be varied to 8 bits (256 phases) independently of an image signal.

With respect to the size of a pixel, a beam diameter in a main scanning direction (that is defined as a width when beam intensity decreases to $1/e^2$ at rest with respect to a maximum value) at 600 dots per inch is 50 [μm] in the main scanning direction and a beam diameter of 60 [μm] in a sub-scanning direction are used in a pixel 42.3 [μm].

Figure 2B:
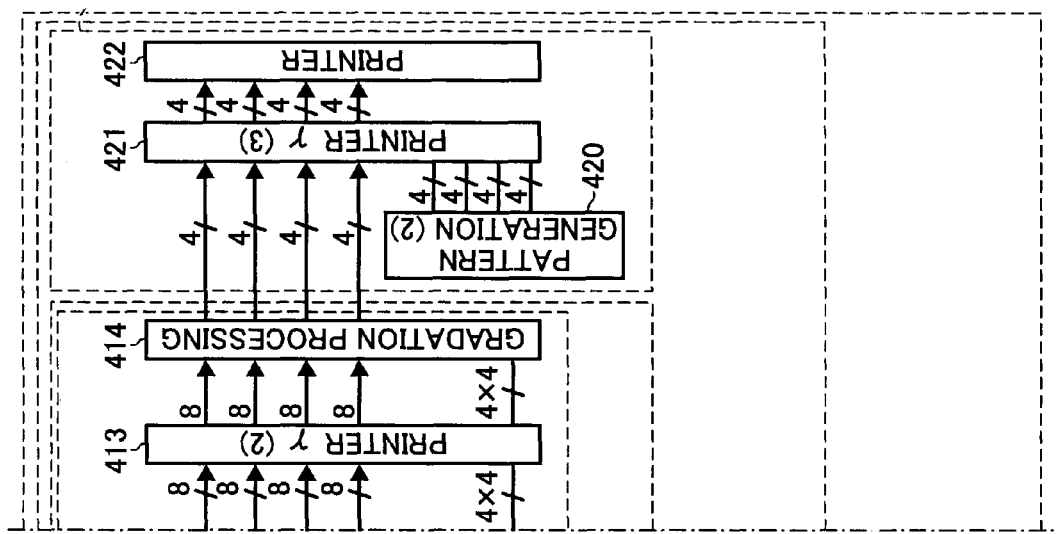
FIG. 2 is a block diagram for explaining laser modulation processing.

An image processing flow is explained based on a block diagram in FIG. 2. In FIG. 2, reference numeral 400 depicts a scanner, 401 shading correction processing, 402 scanner γ-conversion processing, 403 image separation processing, 404 space filter processing, 405 hue discrimination processing, 406 color correction UCR processing, 407 pattern generation processing (1), 408 variable power processing, 409 printer γ-conversion processing (1), 410 binarizing processing, 411 image compression/expansion processing, 412 characteristic amount extraction/low concentration determination processing, 413 printer γ-conversion processing (2), 414 gradation processing, 415 a PCI interface I/F, 416 a PCI bus, 417 a system controller, 418 an image memory, 419 a LAN I/F, 420 pattern generation processing (2), 421 printer γ-conversion processing (3), and 422 a printer.

A copied sheet of document is divided into R, G, B in color by the scanner 400 and is read based on a 10-bit signal as an example (various scanners currently are available that include a number of bits such as 1 to 14). Read image signals are subjected to unevenness correction in the main scanning direction through shading correction processing 401 and are output based on an 8-bit signal.

In scanner γ-conversion processing 402, signals read from the scanner are converted from reflectivity data to brightness data. In image separation processing 403, determination of a character sub-unit, a photograph sub-unit, and a dot sub-unit and determination of a chromatic color or an achromatic color are performed.

In space filter processing 404, processing of changing frequency characteristics of image signals such as edge enhancement and smoothing based on a user's preference such as a sharp image or a soft image as well as edge enhancement processing (applying edge enhancement processing) in response to an edge degree of image signals is performed. Applying edge enhancement such as performing edge enhancement to character edges and not performing edge enhancement to dot images is performed with respect to R, G, and B signals respectively.

Figure 4:
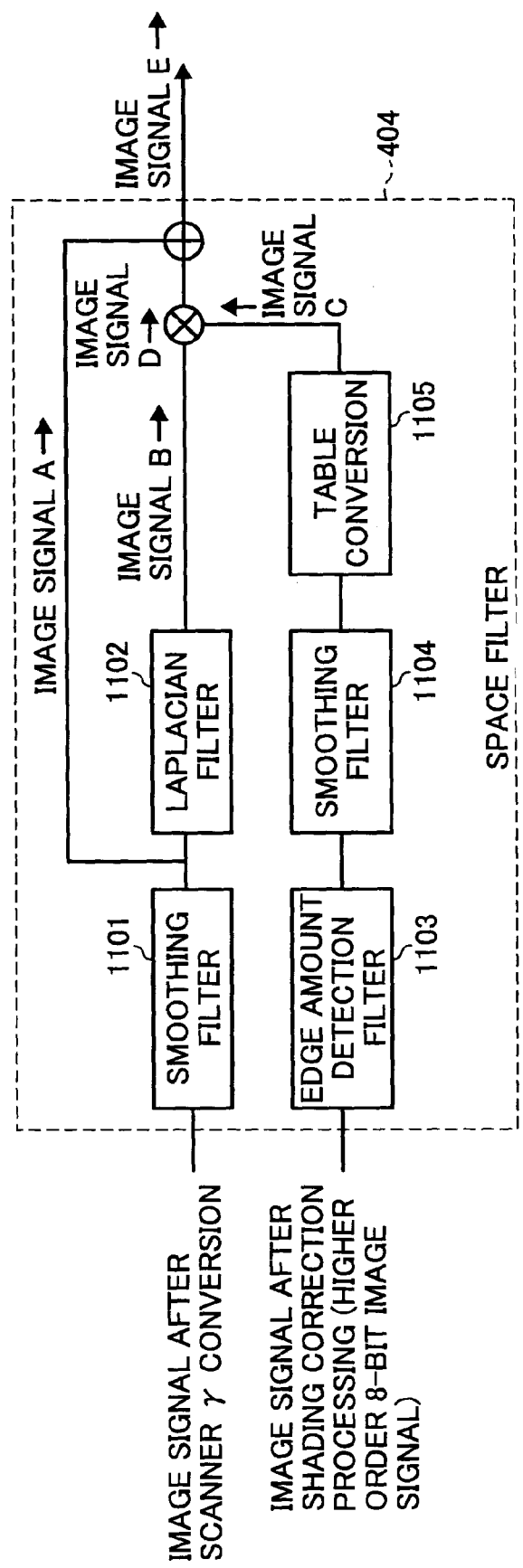
FIG. 4 is an exemplary view for explaining edge enhancement processing.

FIG. 4 is an exemplary view for explaining the edge enhancement processing. Image signals that are converted from reflectivity linear to brightness linear through scanner γ-conversion processing 402 are smoothed in smoothing filter processing 1101. As an example, coefficients shown in FIG. 5A are used.

A differential component of image data is extracted through a next 3×3 Laplacian filter 1102. A specific example of the Laplacian filter is indicated in FIG. 5B.

Edge detection is performed in the higher order 8-bit component (as an example) of a 10-bit image signal that is not subjected to γ-conversion based on scanner γ-conversion through an edge amount detection filter 1103.

Specific examples of the edge amount detection filter are shown in FIGS. 6A to 6D. A maximum value among an edge amount obtained from the edge detection filter shown in FIGS. 6A to 6D is used in a later stage as an edge degree.

The edge degree is smoothed as needed through a smoothing filter 1104 in the later stage, which alleviates effects due to a sensitivity difference between even pixels and odd pixels in the scanner. As an example, coefficients shown in FIG. 6E are used.

Figure 7:
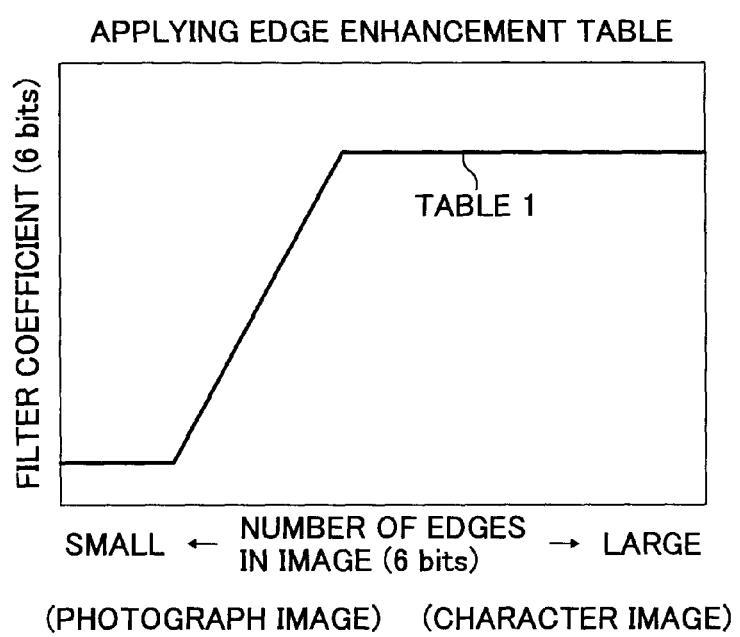
FIG. 7 is a schematic view of a table of table conversion processing as an example.

An edge degree that is found is table-converted through table conversion processing 1105. A density of lines and dots (that includes contrast and concentration), and smoothness of the dot sub-unit are designated based on values of the table. An example of the table is shown in FIG. 7. The edge degree becomes highest in black lines and dots in a white background. The smoother borders among pixels such as minute dots in printing, a silver halide photography, a thermal transfer document, the lower edge degree.

The product (image signal D) obtained by multiplying the edge degree (image signal C) converted by table conversion processing 1105 by an output value (image signal B) of Laplacian filter 1102 is added to an image signal (image signal A) after smoothing processing and the resulting value is transmitted to image processing in the later stage as an image signal E.

Color correction UCR processing 406 includes a color correcting processor correcting a difference between a color resolution characteristic in an input system and a dispersion characteristic of a color material in an output system and calculates an amount of a color material YMC that is needed to reproduce a true color, and a UCR processor replacing part overlapped by three colors of YMC with Bk (black). Color correction processing is implemented by performing the following matrix operation:

$$\begin{bmatrix} Y \\ M \\ C \end{bmatrix} = \begin{bmatrix} a11 & a12 & a13 \\ a21 & a22 & a23 \\ a31 & a32 & a33 \end{bmatrix} \begin{bmatrix} B \\ G \\ R \end{bmatrix} \quad (1)$$

In Equation (1), R, G, B depict complement numbers of R, G, B. Matrix coefficients aij are determined based on the dispersion characteristic of the input system and the output system (color material). A first masking equation is cited as an example. More accurate color correction can be performed by using a second degree term such as B2, BG or a higher degree term. An operational equation can be changed based on a hue and a Neugebauer equation can be also used. Whatever method is used, Y, M, C can be found based on a value of B, G, R (or B, G, R themselves can be used).

On the other hand, UCR processing can be performed by operating based on the following set of equations:

$$Y' = Y - \alpha \cdot \min(Y, M, C)$$

$$M' = M - \alpha \cdot \min(Y, M, C)$$

$$C' = C - \alpha \cdot \min(Y, M, C)$$

$$Bk = \alpha \cdot \min(Y, M, C) \quad (2)$$

In Equations (2), α is a coefficient to determine an amount of UCR. When α=1, UCR processing is surely performed. α can be a certain value. For example, α is near 1 at a high concentration portion and α becomes near 0 at a highlight portion (a low image concentration portion). Thus, an image at the highlight portion can be smooth.

The color correction coefficient differs based on 12 hues obtained by dividing 6 hues of RGBYMC into two or 14 hues obtained by adding black and white thereto. Hue discrimination processing 405 determines which hue read image data corresponds to. Based on the determined result, the color correction coefficient is selected for each hue.

In pattern generation processing (1) 407, a pattern for later-described automatic gradation correction is generated as needed. In variable power processing 408, main scanning variable power and sub-scanning variable power processing are performed.

In printer γ-conversion processing (1) 409, gradation conversion is performed based on image area separation information such as characters, a photograph, and dots from image separation processing 403.

Binarizing processing 410 performs simple binarizing, binary random dither, and binary dither processing to images, to use them at outside computers, that are caught by the scanner 400 and are output on a white-and-black basis through color correction UCR processing 406 in response to an image quality mode.

In image compression/expansion processing 411, compression/expansion processing of image data is performed.

Image data that gets to the image compression/expansion processing 411 through various processing from the scanner 400 is output through the PCI interface I/F 415 to a controller 452.

Image data from the controller 452, which is conversely input through the PCI interface I/F 415 to the image compression/expansion processing 411 receives expansion processing at the image compression/expansion processing 411 and is input to the characteristic amount extraction/low concentration determination processing 412.

The characteristic amount extraction/low concentration determination processing 412 performs characteristic amount extraction of image data and determines whether target pixel data has an edge portion, a non-edge portion, or a weak edge portion that corresponds to a middle portion between an edge portion and a non-edge portion and whether it has low concentration.

In printer γ-conversion processing (2) 413, printer γ-conversion for each of the edge portion, the non-edge portion, and the weak edge portion is performed based on the result of characteristic amount extraction at the characteristic amount extraction/low concentration determination processing 412. Alternatively, printer γ-conversion processing is performed by use of a printer γ-table for an edge portion or a non-edge portion with respect to pixels that are determined as a weak edge portion in response to a gradation processing parameter.

In gradation processing 414, gradation processing is performed by switching a gradation processing parameter based on the result of characteristic amount extraction and the result of low concentration determination at the characteristic amount extraction/low concentration determination processing 412 from 8-bit image data to 4-bit image data as an example.

In printer γ-conversion processing (3) 421, gradation conversion is performed to 4-bit image data, which is output to a printer 422. In pattern generation processing (2) 420, patch data is generated that has a different writing value in process control processing.

Image data that is output from the image compression/expansion processing 411 through the PCI interface I/F 415 to the controller 452 is transmitted through the PCI bus (BUS) 416 to the controller 452. In the controller 452, image data that is stored in the image memory 418 is transmitted from the LAN interface I/F 419 through LAN and is used at outside computers. Image data stored in the image memory 418 is processed by the system controller 417.

Figure 8:
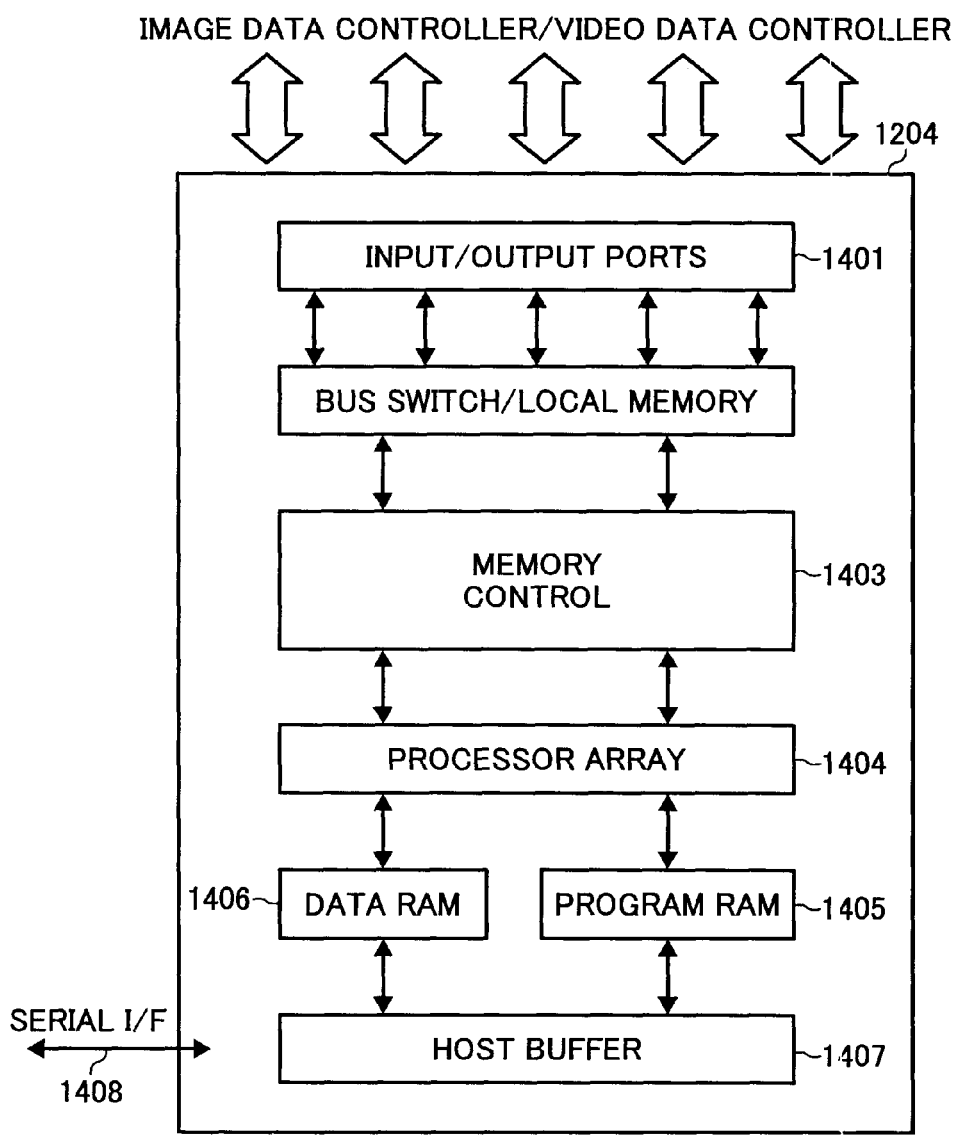
FIG. 8 is a block diagram of an internal configuration of an image processing processor.

FIG. 8 is a block diagram for explaining an internal configuration of an image processing processor 1204.

As shown in FIG. 8, the image processing processor 1204 includes a plurality of input/output ports 1401 with regard to input of data from outside and its output to outside and can arbitrarily set input and output of data respectively.

The image processing processor 1204 includes a bus switch/local memory group 1402 therein to connect the input/output ports 1401 and a memory control unit 1403 controls a memory area to be used and a path of a data bus. Input data and data to be output are stored in the bus switch/local memory group 1402 as an allocated buffer memory respectively and are controlled with regard to I/F with outside.

Various processing is performed to image data stored in the bus switch/local memory group 1402 in a processor array sub-unit 1404 and the output result (processed image data) is stored again in the bus switch/local memory group 1402. A parameter for a processing procedure or processing in the processor array sub-unit 1404 is communicated with a program RAM 1405 and a data RAM 1406.

Contents of the program RAM 1405 and the data RAM 1406 are downloaded from a process controller 211 through a serial I/F 1408 to a host buffer 1407. The process controller 211 reads contents of the data RAM 1406 and monitors the course of processing.

When contents of processing are changed or a processing mode requested by a system is changed, contents of the program RAM 1405 and the data RAM 1406 to which the processor array sub-unit 1404 refers are updated to support the changed contents or mode. The processor array sub-unit 1404 corresponds to an SIMD-type image data processor and a sequential type image data processor according to the first embodiment.

Figures 9, 9A, 9B:
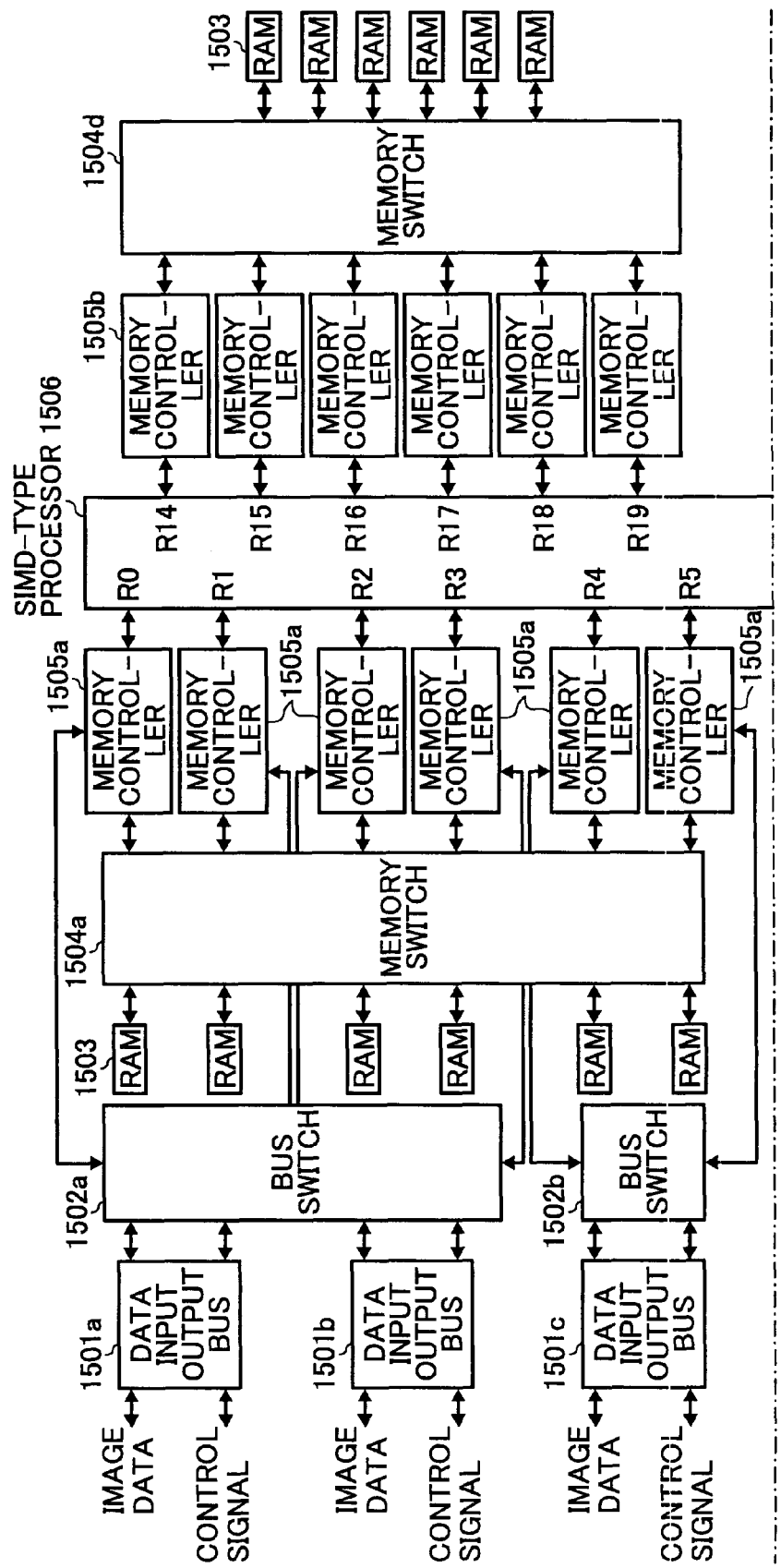
FIG. 9 is a block diagram of an SIMD-type image data processor and a sequential image data operation processor.
Figure 9B:
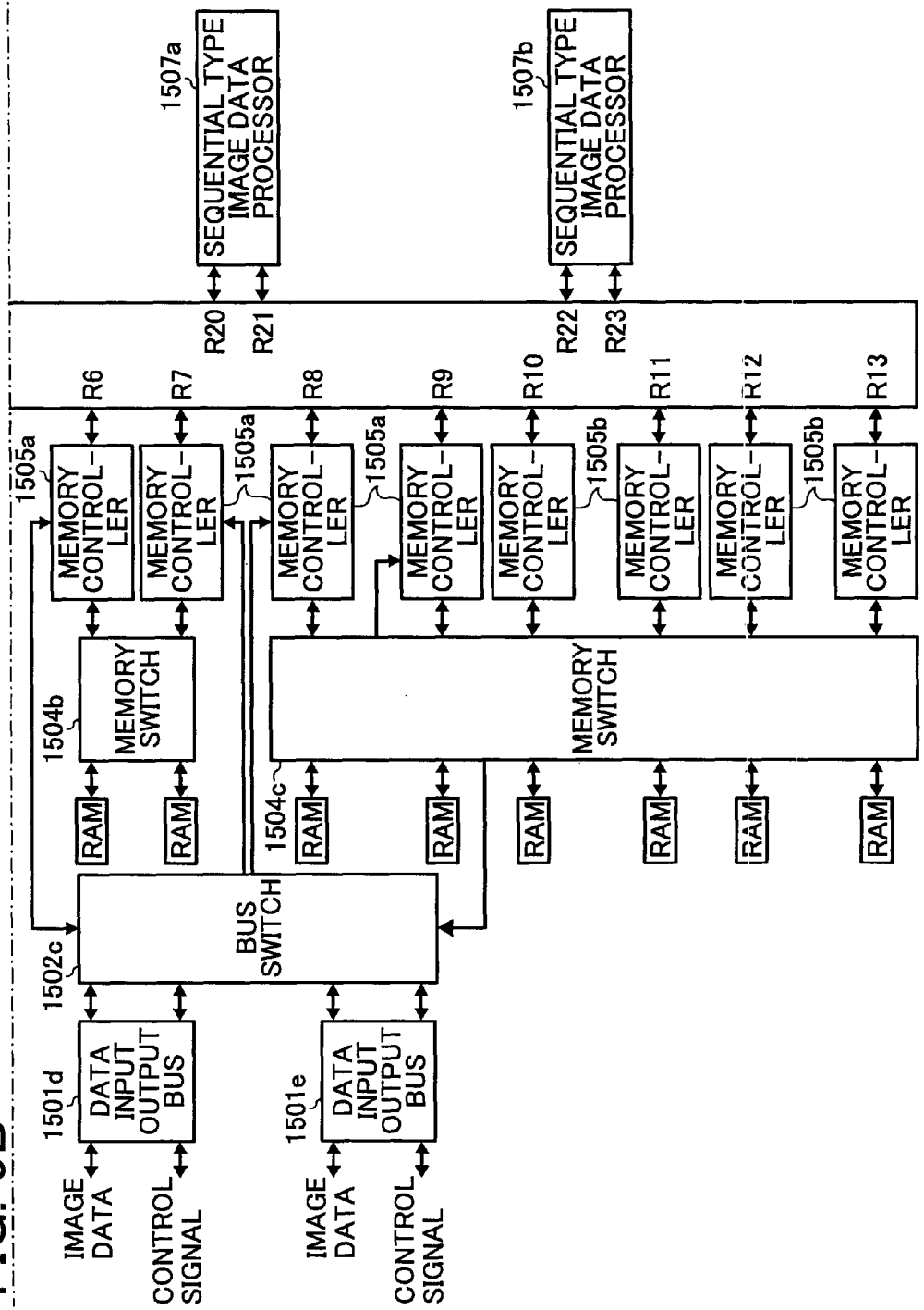

FIG. 9 is a block diagram for explaining a configuration of a SIMD-type image data processor 1500 and a sequential type image data operation processors 1507a and 1507b. An explanation is first given about the SIMD-type image data processor 1500 and next about the sequential type image data processor 1507.

Figure 10:
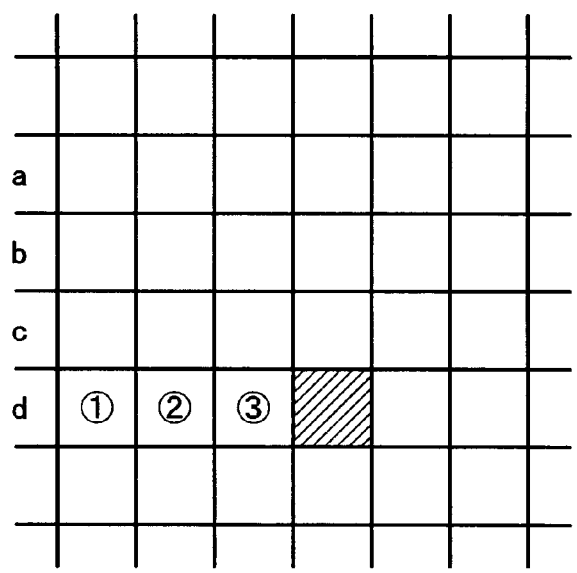
FIG. 10 is a schematic view for explaining pixel lines.

The SIMD-type image data processor 1500 and the sequential type image data processors 1507a and 1507b process an image as a plurality of pixel lines that include a plurality of pixels arranged in one direction. FIG. 10 is a view for explaining pixel lines and indicates four pixel lines a to d. A pixel shown in FIG. 10 that is marked with hatched lines is a target pixel that is processed this time.

In the first embodiment, in consideration of random dither processing of a target pixel, effects of pixels surrounding a target pixel are taken into consideration in both of pixels included on the same pixel line as a target pixel and pixels included on a pixel line different from a pixel line that includes a target pixel. Random dither processing with pixels included on a pixel line without a target pixel is performed in the SIMD-type image data processor 1500, while random dither processing with pixels included on a pixel line with a target pixel is performed in the sequential type image data processors 1507a and 1507b.

The SIMD-type image data processor 1500 includes an SIMD-type processor 1506, 5 data input output buses 1501a to 1501e that input image data and control signals to the SIMD-type image data processor 1500, bus switches 1502a to 1502c that switch the data input output buses 1501a to 1501e to switch over image data and control signals that are input to the SIMD-type processor 1506 and switch over the connected buses in width, 20 RAMs 1503 that store data used in processing input image data, memory controllers 1505a and 1505b that control each RAM 1503 to which each of them corresponds, and 4 memory switches 1504a to 1504d that switch the RAMs 1503 based on control of the memory controller 1505a or 1505b.

In the above configuration, the memory controller controlled by the bus switches 1502a to 1502c as the memory controller 1505b is different from the memory controller that is not controlled by the bus switches 1502a to 1502c as the memory controller 1505a.

Figure 11:
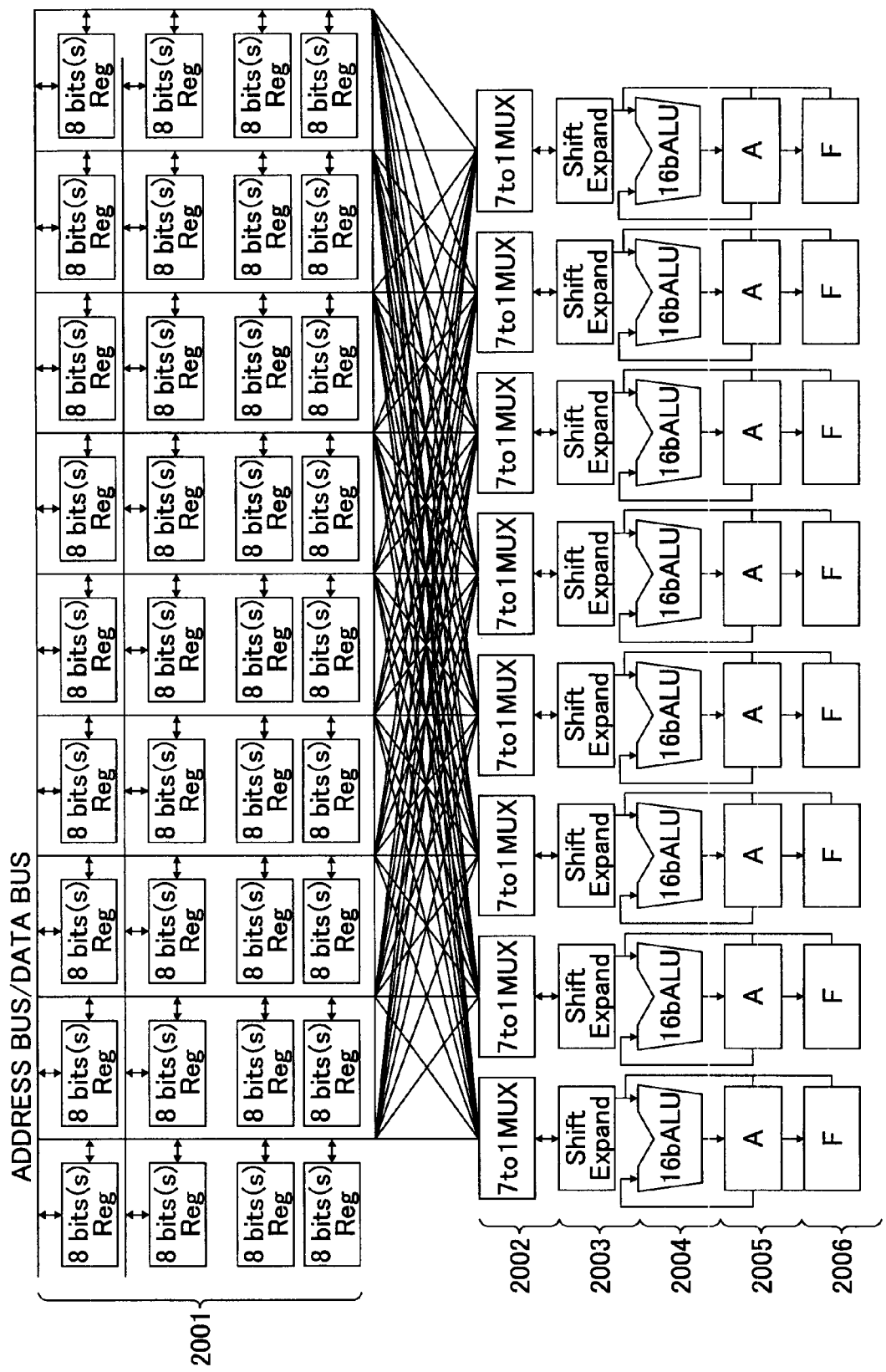
FIG. 11 is a view for explaining a schematic configuration of an SIMD-type image data processor.

FIG. 11 is a view for explaining a schematic configuration of the SIMD-type processor 1506. A single instruction is performed in parallel with respect to a plurality of data by single instruction stream multiple data stream (SIMD), which includes a plurality of processors and elements (PE). The SIMD-type processor is arranged in the processor array sub-unit 1404 in FIG. 8.

Each of PEs includes a register (Reg) 2001 that stores data, a multiplexer (MUX) 2002 to access a register in another PE, a barrel shifter (Shift Expand) 2003, an arithmetic logic operation unit (ALU) 2004, an accumulator (A) 2005 that stores a logical result, and a temporary register (F) 2006 that temporarily saves contents of the accumulator.

Each register 2001 is connected to an address bus and a data bus (a lead line and a word line) and stores an instruction code that prescribes processing and data to be processed. Contents of the register 2001 are input to the ALU 2004 and the operation processing result is stored in the accumulator 2005. To take out the result outside PE, the result is saved in the temporary register 2006 once. Contents of the temporary register 2006 are taken out so that it is possible to obtain the processing result of target data.

The same contents of an instruction code are given to each PE and different data to be processed is given for each PE. Contents of the register 2001 in adjacent PEs are referred to in the multiplexer 2002 so that the operation result is processed in parallel and is output to each accumulator 2005.

For example, if contents of 1 image data line are arranged in PE for each pixel and are subjected to operation processing based on the same instruction code, the processing result worth of one line can be provided in a shorter time than sequential processing for each pixel. Especially, in space filter processing and shading correction processing, an instruction code for each PE is an operation equation itself and processing common in all of PEs can be performed.

The SIMD-type processor 1506 includes a register 0 (R0) to register 23 (R23). Each of the registers R0 to R23 functions as a data interface between PE of the SIMD-type processor 1506 and memory controllers 1505a, 1505b. The bus switch 1502a switches the memory controller 1505b connected to the registers R0 to R3 and inputs control signals to the SIMD-type processor.

The bus switch 1502b switches the memory controllers 1505 that are connected to the registers R4 and R5 to input control signals to the SIMD-type processor. The bus switch 1502c switches the memory controllers 1505 that are connected to the registers R6 to R9 to input control signals to the SIMD-type processor. The bus switch 1502c switches the memory controllers 1505a that are connected to the registers R6 to R9 to input control signals to the SIMD-type processor.

The memory switch 1504a uses the memory controllers 1505a that are connected to the registers R0 to R5 and image data is communicated between PE inside the SIMD-type processor 1506 and RAM 1503. The memory switch 1504b uses the memory controllers 1505a that are connected to the registers R6 and R7 and image data is communicated between PE inside the SIMD-type processor 1506 and RAM 1503. The memory switch 1504c uses the memory controller 1505a or the memory controller 1505b that is connected to one of the registers R8 to R13 and image data is communicated between PE inside the SIMD-type processor 1506 and RAM 1503.

The memory switch 1504d uses the memory controllers 1505b that are connected to the registers R14 to R19 and image data is communicated between PE inside the SIMD-type processor 1506 and RAM 1503.

An image data controller 203 inputs image data and control signals to process image data through the data input output buses 1501a to 1501e to the bus switches 1502a to 1502c. The bus switches 1502a to 1502c switch buses in width that are connected thereto based on control signals. The memory switches 1504a to 1504c are switched to control the memory controllers 1505b that are directly or indirectly connected thereto and take out data required to process image data from RAM 1503.

The SIMD-type image data processor 1500 uses the SIMD-type processor 1506 and performs addition with error data in parallel with regard to a plurality of target pixels. Therefore, a plurality of error data that corresponds to a number of pixels that are processed in batch in the SIMD-type processor 1506 are stored in one of RAMs 1503 connected to the SIMD-type processor 1506. Addition processing that corresponds to a pixel line is collectively performed in the SIMD-type processor 1506 and error data that corresponds to a pixel line is stored in RAM 1503.

A value obtained by adding image data that corresponds to a pixel line and that is processed in batch in the SIMD-type processor 1506 to error data is output one by one through at least two of the registers R20 to R23 to the sequential type image data processors 1507a and 1507b. Error data used in the above processing is calculated by the later-described sequential type image data processors 1507a and 1507b and is input in the SIMD-type processor 1506.

Each of the sequential type image data processor 1507a and 1507b is hardware that operates without being controlled based on a computer program. In FIG. 9, two sequential image data processors 1507a and 1507 are connected to the SIMD-type processor 1506. However, one of the sequential type image data processors is used in dedicated random dither processing that is sequentially performed in the image processing apparatus according to the first embodiment.

Figure 12A:
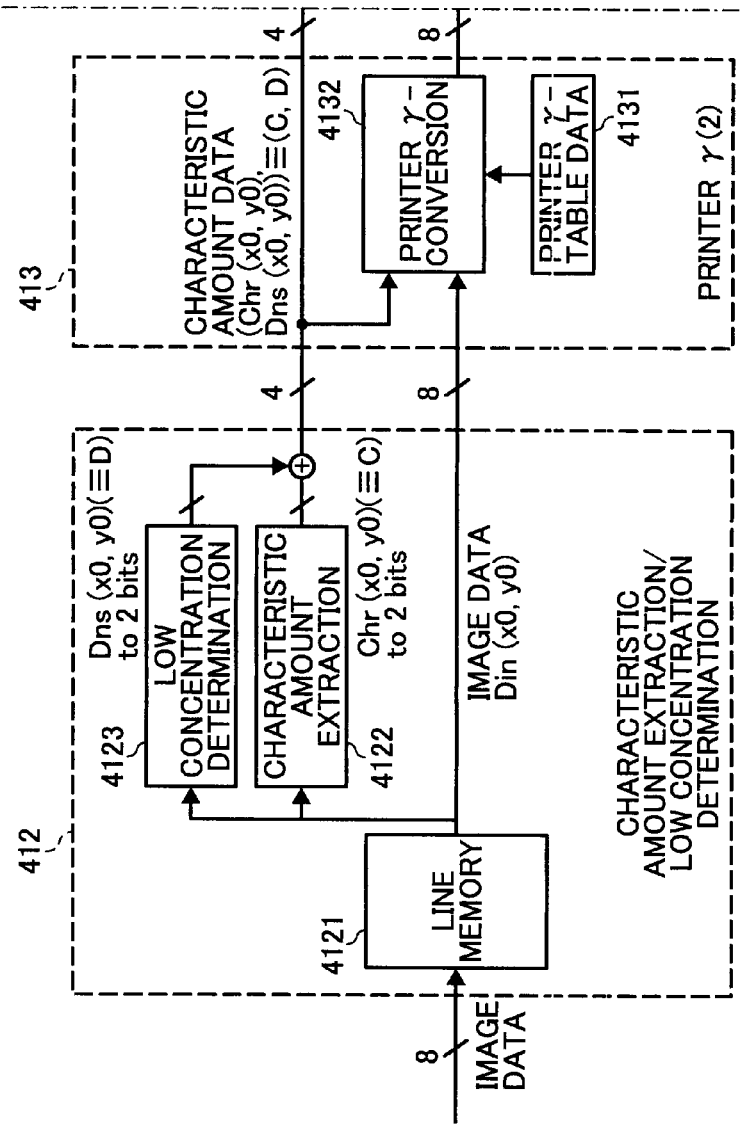
FIG. 12 is a block diagram for explaining a gradation processing method.
Figure 12B:
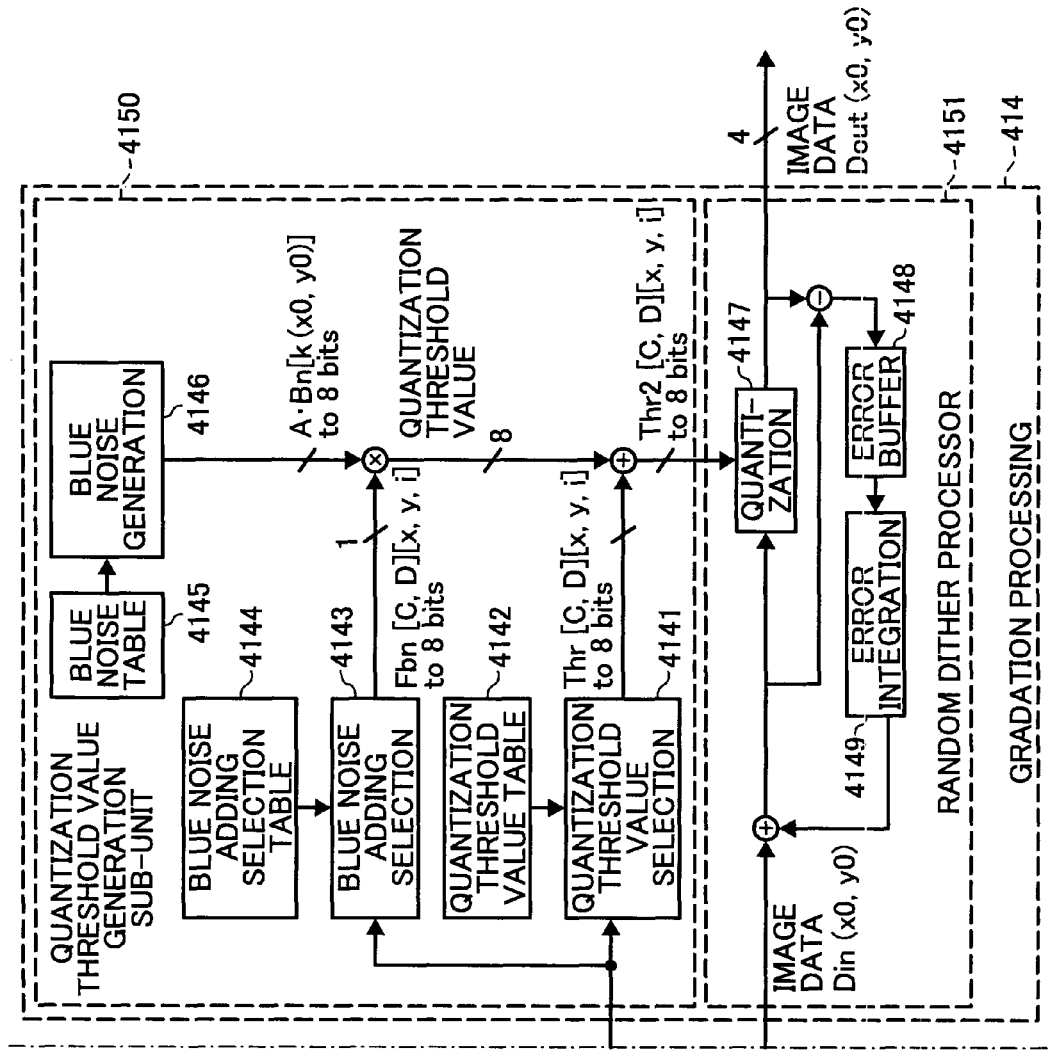

FIG. 12 is a block diagram for explaining a gradation processing method according to an aspect of the present invention.

FIG. 12 indicates processing of one color of YMCK among characteristic amount extraction/low concentration determination processing 412, printer γ-conversion processing (2)

413, and gradation processing 414 in FIG. 2. On the other hand, the copier body 101 shown in FIG. 1 has a configuration in which four colors are processed in parallel. When the configuration is applied to the copier body 101, processing shown in FIG. 12 that corresponds to four colors is used.

As shown in FIG. 12, characteristic amount extraction/low concentration determination processing 412 includes a line memory 4121, a characteristic amount extraction sub-unit 4122, and a low concentration determination sub-unit 4123. The line memory 4121 stores a plurality of lines (5 lines as an example) used in the characteristic amount extraction sub-unit 4122. The characteristic amount extraction sub-unit 4122 determines an edge portion, a non-edge portion, and a weak edge portion (a middle region that has an edge degree between an edge portion and a non-edge portion) (1, 2) in image data based on the following processing. The low concentration determination sub-unit 4123 compares a predetermined concentration threshold value to image data and determines whether image data corresponds to a low concentration (highlight) portion or whether image data corresponds to a portion other than the highlight portion.

In FIG. 12, printer γ-conversion processing (2) 413 includes a printer γ-conversion processor 4132 and a printer γ-table data 4131. The printer γ-conversion processor 4132 refers to a printer γ-table set in the printer γ-table data 4131 based on 2-bit characteristic amount extraction result from the characteristic amount extraction sub-unit 4122 and performs printer γ-conversion.

In FIG. 12, gradation processing 414 includes a quantization threshold value generation sub-unit 4140 and a random dither processor 4151.

A quantization threshold value generation sub-unit 4140 generates a quantization threshold value based on 2-bit characteristic amount extraction result Chr(x0, y0) (≡C={0, 1, 2, 3}, hereinafter, simplified C) in a target pixel (x0, y0) and 2-bit low concentration determination result Dns(x0, y0) (≡D={0, 1, 2, 3}, hereinafter, simplified D) from characteristic amount extraction/low concentration determination processing 412.

For convenience, x0 is a value to designate a pixel in the main scanning direction and y0 is a value to designate a position of a pixel in the sub-scanning direction. In the case of 600 dots per inch, for example, a margin is added to a number of pixels of an A-3-size document that is read and a value near x0max=7, 100, yomax=10,000 is provided as x0={0, 1, 2, ..., x0max}; y={0, 1, 2, ..., y0max}. When corresponding to a document size of A1, values of x0max and y0max become larger.

A quantization threshold value Thr[C, D] [x, y, i] that corresponds to the characteristic amount extraction result C={0, 1, 2, 3} and the low concentration determination result D={0, 1, 2, 3} is set in a quantization threshold value table sub-unit 4142.

A blue noise adding table Fbn[C, D] [x, y, i] that corresponds to each of quantization threshold values Thr[C, D] [x, y, i] set in the quantization threshold value table sub-unit 4142 is set in a blue noise adding selection table sub-unit 4144. By using a matrix size of xmax in the main scanning direction and a matrix size of ymax in the sub-scanning direction in a quantization threshold value matrix, x, y of [x, y, i] are as follows:

$$x=\{0, 1, 2, \ldots, x\max-1\} \quad (3)$$

$$y=\{0, 1, 2, \ldots, y\max-1\} \quad (4)$$

i has M as a number of output gradation of image data and corresponds to values in the following equation:

$$i=\{0, 1, 2, \ldots, M-2\} \quad (5)$$

To simplify a later explanation, regarding Z as a group of integers, Equations (3) to (5) have the same meaning respectively as:

$$Z\{x\max\}=\{x \in Z; 0 \leq x < x\max\} \quad (6)$$

$$Z\{y\max\}=\{y \in Z; 0 \leq y < y\max\} \quad (7)$$

$$Z\{M-1\}=\{i \in Z; 0 \leq i < M-1\} \quad (8)$$

That is, in Equation (6), x∈Z indicates that "x is an integer" and moves in a range of 0≤x<xmax so that x={0, 1, 2, ..., xmax−1}.

Likewise, a range Z{x0max} of a value that a position x0 in the main scanning direction can represent, a range Z{y0max} of a value that a position y0 in the sub-main scanning direction can represent, a range Z{Cmax} of a value that a characteristic amount extraction result C can represent, a range Z{Dmax} of a value that a low concentration determination result D can represent, a range Z{N} of a value that a quantization threshold value Thr[C, D][x, Y, i] can represent, a range Z{Bn} of a value that a blue noise Bn[k] can represent, a range Z{Bnmax} of a value that an index k of Bn[k] can represent, and a range Z{Fbn} of a value that blue noise adding selection Fbn[C, D][x, Y, i] can represent are also defined as follows:

$$Z\{x0\max\}=\{x0 \in Z; 0 \leq x0 < x0\max\}$$

$$Z\{y0\max\}=\{y0 \in Z; 0 \leq y0 < y0\max\}$$

$$Z\{C\max\}=\{C \in Z; 0 \leq C < C\max\}$$

$$Z\{D\max\}=\{D \in Z; 0 \leq D < D\max\}$$

$$Z\{N\}=\{Din \in Z; 0 \leq Din < N-1\}$$

$$Z\{Bn\}=\{\pm 1\}$$

$$Z\{Bn\max\}=\{k \in Z; 0 \leq k < Bn\max\}$$

$$Z\{Fbn\}=\{0, 1\}.$$

Cmax=Dmax=4 in the embodiment, but not limited to the value, and can be altered as needed.

Figure 13:
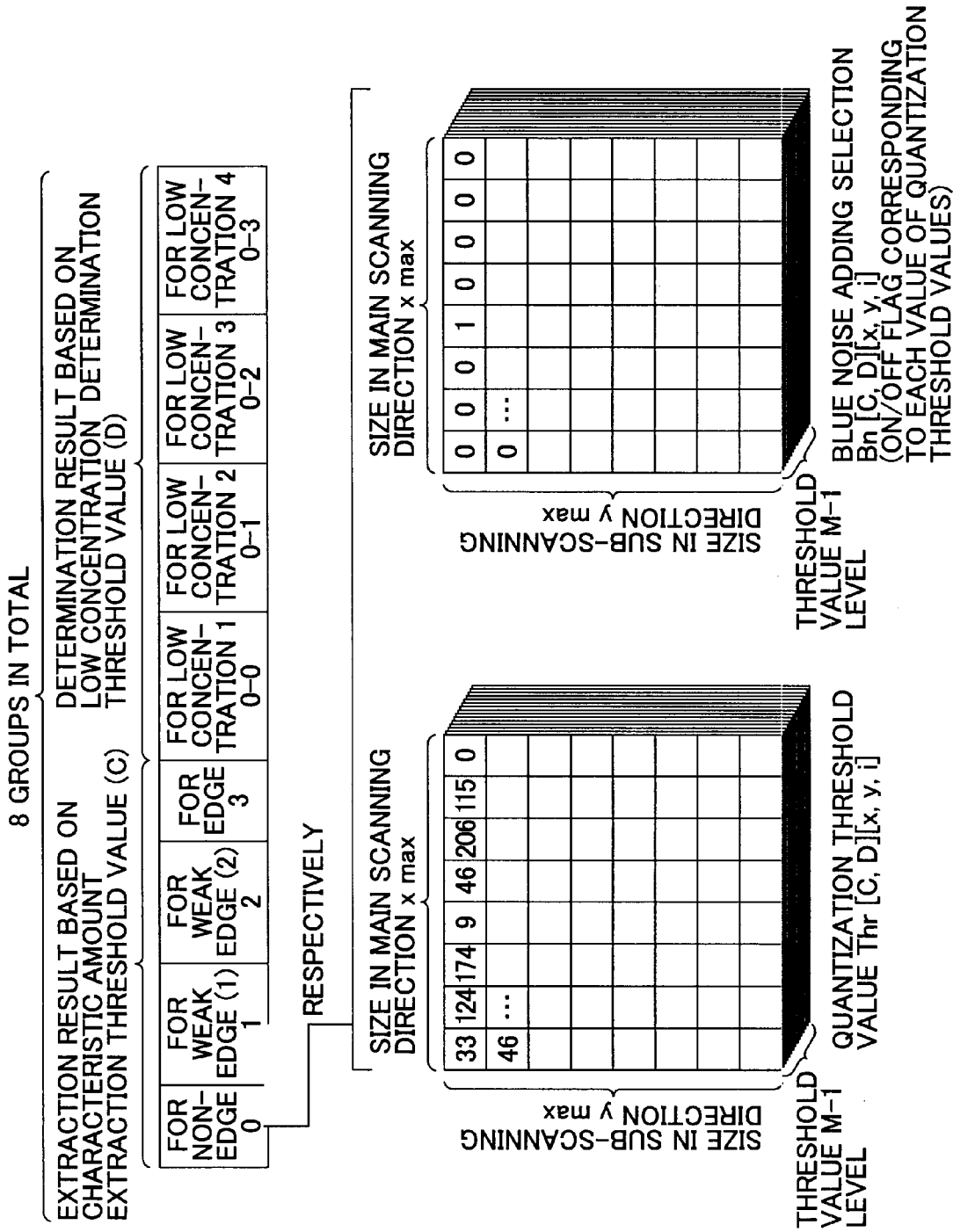
FIG. 13 is a schematic view for explaining a configuration of a quantization threshold value Thr[C, D] [x, Y, i]

FIG. 13 is a schematic view for explaining a configuration of a quantization threshold value Thr[C, D] [x, y, i].

A quantization threshold value Thr[C, D] [x, Y, i] that has a size xmax of the main scanning direction and a size ymax of the sub-scanning direction is prepared by a level worth of M−1. Four kinds of quantization threshold values in response to the characteristic amount extraction result Chr(x0, y0) (≡C) ∈Z{Cmax} and four kinds of quantization threshold values in response to the low concentration determination result Dns(x0, y0) (=D) ∈Z{Dmax} are set in the quantization threshold value table sub-unit 4142. These are quantization threshold values worth of one color and ones worth of four colors are actually set.

In response to each of the quantization threshold values Thr[C, D] [x, y, i] ∈Z{N} (C∈Z{Cmax}, D∈Z{Dmax} x∈Z{xmax}, y∈Z{ymax}, i∈Z{M−1}), the blue noise adding selection Fbn[C, D] [x, y, i] ∈Z{Fbn} (C∈Z{Cmax}, D∈Z{Dmax} x∈Z{xmax}, y∈Z{ymax}, i∈Z{M−1}) is set in the blue noise adding selection table sub-unit 4144.

A quantization threshold value selection sub-unit 4141 and a blue noise adding selection sub-unit 4143 select a quantization threshold value Thr[C, D] [x, Y, i] that is applied to a target pixel (x0, Y0) respectively from the quantization threshold value table sub-unit 4142 and a blue noise adding selection flag Fbn[C, D] [x, y, i] from the blue noise adding selection table sub-unit 4144 based on the characteristic amount extraction result C and the low concentration determination result D.

The blue noise table 4145 holds a blue noise table BnT[k] (k=0, 1, 2, ..., bnmax−1), BnT[k]={0, 1} that is used to generate blue noise Bn[k](k=0, 1, 2, ..., bnmax−1), Bn[k]={−1, 1} that has non-periodic characteristics. bnmax−1 is number of parameters that have blue noise. BnT[k] and Bn[k] are in a relation:

when $BnT[k]=0$, $Bn[k]=-1$, and when $BnT[k]=1$, $Bn[k]=+1$.

The blue noise table BnT[k]={0, 1} contains a 1-bit signal that represents data of one pixel, that is, contains bnmax-bit of data that represents data of bnmax pixels.

A blue noise generation unit 4146 calculates and outputs a blue noise amplitude A from the output BnT[k] of the blue noise table 4145 as:

when $BnT[k]=0$, $A \cdot Bn[k]=(-1) \cdot A = -A$, and when $BnT[k]=1$, $A \cdot Bn[k]=A$.

A quantization threshold value Thr2[C, D] [x, y, i] that is applied to a target pixel (x0, Y0) used in a quantization sub-unit 4147 is found as follows, regarding Bn[k]={−1, 1} in blue noise Bn[k] (k=0, 1, 2, ..., bnmax−1), and an amplitude of blue noise as A.

A quantization threshold value Thr2[x, Y, i] $\in Z\{N\}$ (x$\in Z\{xmax\}$, y$\in Z\{ymax\}$, i$\in Z\{M-1\}$) is generated in the quantization threshold value generation sub-unit 4140.

$$Thr2[C,D][x,y,i]=Thr[C,D][x,y,i]+Fbn[C,D][x,y,i]\times Bn[k(x0,y0)]\times A \quad (9)$$

Equation (9) satisfies a condition of Thr2[C, D] [x, Y, i], Thr[C, D] [x, Y, i] $\in Z\{N\}$, x$\in Z\{xmax\}$, y$\in Z\{ymax\}$, i$\in Z\{M-1\}$.

By using a combination of the following equations:

$$x0 \equiv (x \bmod x\,max) \quad (10)$$

$$y0 \equiv (y \bmod y\,max) \quad (11)$$

X0≡(x mod xmax) in k(x0, y0)≡{x0max×(y0−1)}+(x0 mod bnmax) indicates the remainder when dividing x0 by a size xmax of a quantization threshold value matrix in the main scanning direction. Here, a range of a value that x and y can represent is x$\in Z\{xmax\}$ and y$\in Z\{ymax\}$ by using reference signs Z{xmax} and Z{ymax} in Equations (6) and (7).

The above equations are ones when applying a quantization threshold value Thr[C, D] [0, 0, i] to (x0, y0)=(0, 0). An offset xofs $\in Z\{xmax\}$ in the main scanning direction and an offset yofs $\in Z\{ymax\}$ in the sub scanning direction can be applied to (x0, y0)=(0, 0) to use Thr[C, D] [xofs, yofs, i].

In this event, Equations (10) and (11) can be replaced respectively by:

$$x0+xofs \equiv (x \bmod x\,max) \quad (12)$$

$$y0+yofs \equiv (y \bmod y\,max) \quad (13)$$

4-bit random dither processing is explained as an example in the embodiment.

The quantization sub-unit 4147 compares input image data Din(x0, y0) of a target pixel to a quantization threshold value Thr[x, y, i]. When the resulting value is larger than Thr[x, y, 14], "15". When the resulting value is larger than Thr[x, y, 13], "14". These are to be repeated in the following. 4-bit (16 gradations) quantization data Dout(x0,Y0) in which a value is "1" when larger than Thr[x, Y, 0] and in which a value is "0" when smaller than Thr[x, Y, 0] is output.

An error integration sub-unit 4149 calculates a diffusion error that is added to the following target pixel based on quantization error data stored in an error buffer 4148. In the embodiment, the error integration sub-unit 4149 calculates diffusion error data by use of an error diffusion matrix that has a size of 3 pixels in the sub-scanning direction and 5 pixels in the main scanning direction shown in FIG. 14.

In FIG. 14, a mark * corresponds to a position of the following target pixel and a, b, ..., k, l are coefficients (32 in total) that correspond to positions of 12 pixels that have been already processed in its vicinity. In an error diffusion matrix sub-unit 4145 in FIG. 12, a value obtained by dividing a sum of products of coefficients a to l that correspond to a quantization error with respect to 12 pixels that have been already processed by 32 is given to an error adding sub-unit 1125 as a diffusion error with respect to the following target error.

FIG. 15 is a block diagram of the characteristic amount extraction/low concentration determination sub-unit 4122. The characteristic amount extraction/low concentration determination sub-unit 4122 detects edges in image data Din (x0, y0). In the embodiment, as an output of the characteristic amount extraction result Chr(x0, y0) with respect to a target pixel (x0, y0), 2-bit edge data that represents an edge level of level 3 (the maximum edge degree) to level 0 (non-edge) is output.

As an example, with regard to characteristic amount extraction, differential filters 1 to 4 of four kinds of first derivation 5×5 shown in FIGS. 16A to 16D and differential filters of second deviation shown in FIGS. 17A to 17D are used, an amount of edge is detected in 4 directions of the main scanning direction, the sub-scanning direction, and directions tilted from the main scanning direction by ±45 degrees, an edge amount that has a maximum absolute value is selected among them, and the absolute value of the edge amount is quantized into 4 edge levels from level 0 to level 3 for output.

The low concentration determination sub-unit 4123 compares a predetermined threshold value to input image data Din and outputs a value of 0 as lowest concentration and a value of 3 as highest concentration, as output of a low concentration determination result Dns(x0, y0) with respect to a target pixel (x0, y0).

FIGS. 18 to 20 are exemplary views of non-edge (a photograph portion) quantization threshold values (C, D)=(0, 3), Thr[0, 3] [x, y, i] (ii=0, 4, 5) of 7×7 ((pixels in the main scanning direction)×(pixels in the sub-scanning direction)) in the embodiment.

Corresponding to the quantization threshold value, blue noise adding selection Fbn[0, 3] [x, y, i] (i$\in Z\{M-1\}$) is set as Fbn[0, 3] [x, y, i] shown in FIG. 21 with respect to i={i$\in Z\{M-1\}$; i≠4, 5} and is set as Fbn[0, 3] [x, y, i] shown in FIG. 22 with respect to i={i$\in Z\{M-1\}$; i=4, 5}.

A set value of the quantization threshold value Thr[0, 3] [x, y, i] (i={0, 1, 2, 3, 4}) that corresponds to blue noise adding selection Fbn[0, 3] [x, y, i] that sets 1 in blue noise adding selection Fbn[0, 3] [x, y, i] shown in FIG. 22 is a minimum value between Thr[0, 3] [x, y, i]=8 and Thr[0, 3] [x, y, i] (i={0, 1, 2, 3, 4}) and represents a pixel that is formed for the first time in dither processing. This is called as "core of dither". A value of blue noise adding selection Fbn[0, 3] [x, y, i] is set to add blue noise with respect to the core of dither.

Quantization threshold values Thr[0, 3] [x, y, i] (ii $\in Z\{M-1\}$) are indicated in Table 1 with regard to (x, y)=(3, 0) as one of cores of dither.

TABLE 1

A quantization threshold value Thr[0, 3][3, 0, i] and blue noise adding selection Fbn[0, 3][3, 0, i] in a characteristic amount extraction result and a low concentration determination result (C, D) = (0, 3), (x, y) = (3, 0)

| | I = | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 8 | 8 | 8 | 8 | 8 | 16 | 20 | 24 | 28 | 32 | 36 | 40 | 44 | 48 | 52 |
| Fbn[ ] | 0 | 0 | 0 | 0 | 1 | 1 | 0 | 0 | 0 | 0 | 0 | 0 | 0 | 0 | 0 |

Quantization threshold values Thr[0, 3] [3, 0, i] in i={0, 1, 2, 3} in Table 1 are the same and Fbn[0, 3] [3, 0, i]=1 in i=4, 5 so that not only occurrence of texture is prevented but also graininess is improved based on random dither processing.

TABLE 2 a quantization threshold value Thr[0, 3][3, 0, i] and blue noise adding selection Fbn[0, 3][3, 0, i] in a characteristic amount extraction result and a low concentration determination result (C, D) = (0, 3), (x, y) = (3, 0)

| | I = | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 16 | 14 | 12 | 10 | 8 | 16 | 20 | 24 | 28 | 32 | 36 | 40 | 44 | 48 | 52 |
| Fbn[ ] | 0 | 0 | 0 | 0 | 1 | 1 | 0 | 0 | 0 | 0 | 0 | 0 | 0 | 0 | 0 |

As shown in Table 2, when a relation of a quantization threshold value Thr[0, 3] [3, 0, i] (i=0, 1, 2, 3, 4, 5) is Thr[0, 3] [3, 0, 0]> . . . >Thr[0, 3] [3, 0, 3]>Thr[0, 3] [3, 0, 4]<Thr[0, 3] [3, 0, 5], setting of blue noise adding selection Fbn[0, 3] [3, 0, i] is desirably addition (1) with respect to i=4, 5.

Therefore, in a threshold value level j (j=4 in the above-described case) that satisfies:

$$Thr[0,3][x,y,i] \geq Thr[0,3][x,y,j] < Thr[0,3][x,y,j+1] \leq N-1 \quad (14)$$

as a relation of a quantization threshold value with respect to i, j (0≦i<j<M−1), setting is desirably performed as blue noise adding selection Fbn[C, D] [x, y, i]=1. 1 is not set in Fbn[0, 3] [3, 0, i] with respect to i<4 so that occurrence of unevenness is prevented.

In addition, in consideration of the quantization threshold value Thr[0, 3] [x, y, j] that satisfies a condition of Equation (14), blue noise adding selection Fbn[0, 3] [x, y, k] (k≧j+2 and k≦N−1) is set not to add blue noise with respect to a threshold value level equal to or more than 2 level larger than a threshold value j. This makes it possible to prevent occurrence of unevenness.

TABLE 3 a quantization threshold value Thr[3, 3][x, y, i] and blue noise adding selection Fbn[3, 3][x, y, i] in a characteristic amount extraction result and a low concentration determination result (C, D) = (3, 3), (x, y) = (3, 0)

| | I = | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 32 | 48 | 48 | 48 | 48 | 96 | 96 | 96 | 96 | 96 | 144 | 144 | 144 | 144 | 144 |
| Fbn[ ] | 1 | 0 | 0 | 0 | 1 | 1 | 0 | 0 | 0 | 1 | 1 | 0 | 0 | 0 | 0 |

FIGS. 23 to 26 are views for explaining quantization threshold values Thr[3, 3] [x, y, i] of 7×7 ((pixels in the main scanning direction)×(pixels in the sub-scanning direction)) for a high concentration portion (D=3) of an edge portion (C=3) when i=0, i={1, 2, 3, 4}, i=5, and i=6 to 14 respectively.

The quantization threshold value Thr[3, 3] [x, y, i] for an edge portion receives simple random dither processing in which the same threshold values of 7×7 ((pixels in the main scanning direction)×(pixels in the sub-scanning direction)) are set and provide good character reproductivity.

FIGS. 27 and 28 are views of blue noise adding selection Fbn[3, 3] [x, y, i] that corresponds to the quantization threshold values when (i≠0, 4, 5 and 0≦i≦14), and when i={0, 4, 5} respectively.

Table 4 represents set examples of the quantization threshold values Thr[3, 3] [x, y, i] and blue noise adding selection Fbn[3, 3] [x, y, i] that corresponds thereto.

TABLE 4 a quantization threshold value Thr[3, 3][x, y, i] and blue noise adding selection Fbn[3, 3][x, y, i] in a characteristic amount extraction result and a low concentration determination result (C, D) = (3, 3), (x, y) = (3, 0)

| | I = | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 32 | 48 | 48 | 48 | 48 | 64 | 80 | 96 | 102 | 118 | 132 | 160 | 176 | 192 | 208 |
| Fbn[ ] | 1 | 0 | 0 | 0 | 1 | 1 | 0 | 0 | 0 | 0 | 0 | 0 | 0 | 0 | 0 |

TABLE 5 a quantization threshold value Thr[3, 3][x, y, i] and blue noise adding selection Fbn[3, 3][x, y, i] in a characteristic amount extraction result and a low concentration determination result (C, D) = (3, 3), (x, y) = (3, 0)

| | I = | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 8 | 8 | 8 | 8 | 8 | 255 | 255 | 255 | 255 | 255 | 255 | 255 | 255 | 255 | 255 |
| Fbn[ ] | 0 | 0 | 0 | 0 | 1 | 0 | 0 | 0 | 0 | 0 | 0 | 0 | 0 | 0 | 0 |

TABLE 6 settings ST1 to ST5 of a quantization threshold value Thr[3, 3][x, y, i] and blue noise adding selection Fbn[3, 3][x, y, i] in a characteristic amount extraction result and a low concentration determination result (C, D) = (3, 3), (x, y) = (3, 0)

| | I = | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 32 | 48 | 48 | 48 | 48 | 64 | 80 | 96 | 102 | 118 | 132 | 160 | 176 | 192 | 208 |
| Fbn[ ] ST1 | 0 | 0 | 0 | 0 | 1 | 0 | 0 | 0 | 0 | 0 | 0 | 0 | 0 | 0 | 0 |
| Fbn[ ] ST2 | 1 | 0 | 0 | 0 | 1 | 1 | 0 | 0 | 0 | 0 | 0 | 0 | 0 | 0 | 0 |
| Fbn[ ] ST3 | 1 | 1 | 0 | 0 | 1 | 1 | 1 | 0 | 0 | 0 | 0 | 0 | 0 | 0 | 0 |
| Fbn[ ] ST4 | 1 | 1 | 0 | 0 | 1 | 1 | 1 | 1 | 1 | 0 | 0 | 0 | 0 | 0 | 0 |
| Fbn[ ] ST5 | 1 | 1 | 0 | 0 | 1 | 1 | 1 | 1 | 1 | 1 | 1 | 1 | 1 | 1 | 1 |

TABLE 7 settings ST1 to ST5 of a quantization
threshold value Thr[0, 3][3, 0, i] and blue noise
adding selection Fbn[0, 3][3, 0, i] in a characteristic
amount extraction result and a low concentration
determination result (C, D) = (0, 3), (x, y) = (3, 0)

| | I = | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 8 | 8 | 8 | 8 | 8 | 16 | 20 | 24 | 28 | 32 | 36 | 40 | 44 | 48 | 52 |
| Fbn[ ] ST1 | 0 | 0 | 0 | 0 | 0 | 0 | 0 | 0 | 0 | 0 | 0 | 0 | 0 | 0 | 0 |
| Fbn[ ] ST2 | 0 | 0 | 0 | 0 | 1 | 1 | 0 | 0 | 0 | 0 | 0 | 0 | 0 | 0 | 0 |
| Fbn[ ] ST3 | 0 | 0 | 0 | 0 | 1 | 1 | 1 | 0 | 0 | 0 | 0 | 0 | 0 | 0 | 0 |
| Fbn[ ] ST4 | 0 | 0 | 0 | 0 | 1 | 1 | 1 | 1 | 1 | 0 | 0 | 0 | 0 | 0 | 0 |
| Fbn[ ] ST5 | 0 | 0 | 0 | 0 | 1 | 1 | 1 | 1 | 1 | 1 | 1 | 1 | 1 | 1 | 1 |

TABLE 8 settings ST1 to ST5 of a quantization threshold value
Thr[3, 3][x, y, i] and blue noise adding selection Fbn[3, 3][x, y,
i] in a characteristic amount extraction result and a low
concentration determination result (C, D) = (3, 3), (x, y) = (3, 0)

| | I = | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Thr[ ] | 32 | 48 | 48 | 48 | 48 | 96 | 96 | 96 | 96 | 96 | 144 | 144 | 144 | 144 | 144 |
| Fbn[ ] ST1 | 0 | 0 | 0 | 0 | 1 | 0 | 0 | 0 | 0 | 1 | 0 | 0 | 0 | 0 | 0 |
| Fbn[ ] ST2 | 1 | 0 | 0 | 0 | 1 | 1 | 0 | 0 | 0 | 1 | 1 | 0 | 0 | 0 | 0 |
| Fbn[ ] ST3 | 1 | 0 | 0 | 0 | 1 | 1 | 1 | 0 | 0 | 1 | 1 | 1 | 0 | 0 | 0 |
| Fbn[ ] ST4 | 1 | 0 | 0 | 0 | 1 | 1 | 1 | 1 | 0 | 1 | 1 | 1 | 0 | 0 | 0 |
| Fbn[ ] ST5 | 1 | 0 | 0 | 0 | 1 | 1 | 1 | 1 | 1 | 1 | 1 | 1 | 1 | 1 | 1 |

FIGS. 29 and 30 are views of quantization threshold values Thr[0, 0] [x, y, i] when a low concentration determination result D is determined as lowest (D=0). Likewise of the quantization threshold value Thr[3, 3] [x, y, i] for the edge portion (C=3), the quantization threshold value does not depend on values of (x, y) but is constant. This makes it possible to prevent texture from occurring in a low concentration portion.

Table 5 represents the quantization threshold value Thr[3, 3] [x, y, i] and the blue noise adding selection Fbn[0, 0] [x, y, 4] that corresponds thereto.

In Table 5, only blue noise adding selection Fbn[0, 0] [x, y, 5] that corresponds to the quantization threshold value Thr[3, 3] [x, y, 4] is set and is not set in Thr[3, 3] [x, y, 5]=255. To be Thr[3, 3] [x, y, 5]=255=N−1, a blue noise amplitude A>0. To be Thr[3, 3] [x, y, 5]+A>255=N−1, 1 to designate blue noise adding is not set to blue noise adding selection Fbn[3, 3] [x, y, i]. Note that even if setting is performed, it does not cause effects but a problem does not occur.

In a portion where a change is big and an edge level is in level 3 (a maximum edge degree) such as characters in an image and an edge portion in a line drawing, the quantization threshold value that is generated in a quantization threshold value generation sub-unit 4140 is fixed and quantization processing based on a genuine random dither method in which fixed threshold value is used is performed in a quantization processor 1120. Thus, it is possible to form a high-resolution image.

A large degree of change in a quantization threshold value that is generated by the quantization threshold value generation sub-unit 4140 causes quantization processing in the quantization processor 1120 based on dithering and image data are dotted on a dither threshold value basis in a portion where an edge degree is small such as an even portion of a photograph or an image. A dither threshold value matrix in a predetermined threshold value arrangement is used to generate a quantization threshold value so that, as a concentration level in image data increases, output dots are generated along a screen angle in a dither threshold value period from a middle of a line in a whorled manner.

Tables 6 to 8 represent examples of set levels 1 to 5 in blue noise adding selection Fbn[C, 3] [x, y, i] with respect to the quantization threshold value Thr[C, 3] [x, y, i] respectively shown in Tables 1, 3, and 4. Tables 6 and 8 are used for characters. Table 7 represents the quantization threshold value Thr[C, 3] [x, y, i] and the blue noise adding selection Fbn[0, 3] [x, y, i] for a photograph.

As a set level 1 proceeds to 4, there is a likelihood that texture is easy to be removed while unevenness of an image increases.

In FIG. 31, by setting texture removal on an operation screen from "strong" to "smooth", it is possible to select settings ST1 to ST5 of blue noise adding selection Fbn[3, 3] [x, y, i] and match an image that a user prefers.

In settings ST1 to ST4 of blue noise adding selection Fbn [3, 3] [x, y, i] represented in Table 6, when using the gradation processing with respect to image data input from the scanner, blue noise adding selection Fbn[3, 3] [x, y, i] in setting ST1 is used. On the other hand, when there is a huge amount of image data that is uniform in concentration like a business graphic formed by a computer, setting ST3 is used.

Input image data can be selected from the scanner or the computer, associated with setting of a printer driver of the computer.

As an example, when "graph" is designated in settings of a printer driver of the computer, blue noise adding selection Fbn[3, 3] [x, y, i] in setting ST3 is used. When "photograph" is designated, blue noise adding selection Fbn[3, 3] [x, y, i] in setting ST1 is used.

Figure 32:
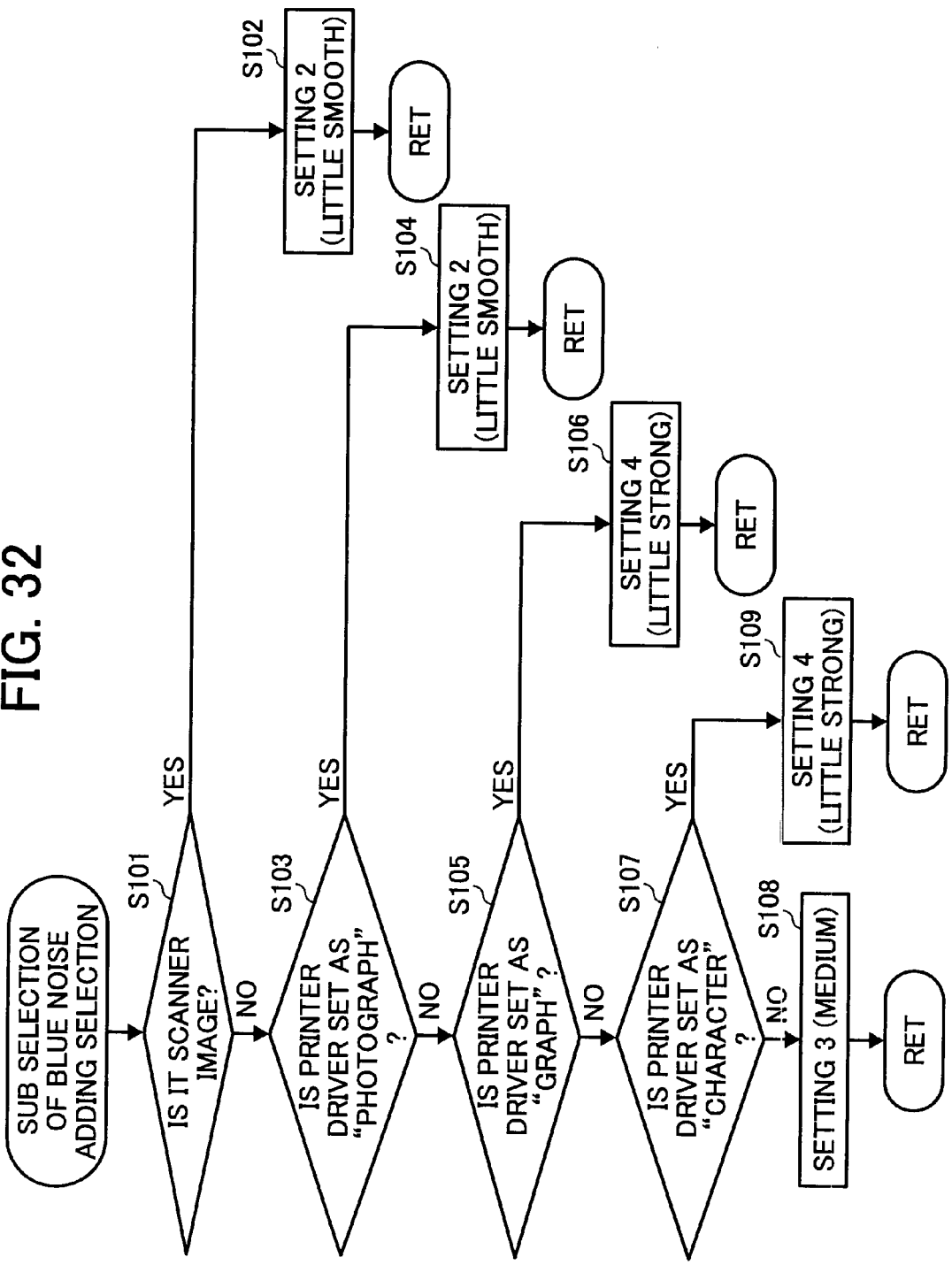
FIG. 32 is a flowchart for explaining an example of blue noise adding selection processing.

As shown by a flowchart in FIG. 32, it is determined whether image data is input from the scanner at step S101. When it is input from the scanner at step S102, blue noise adding selection is set as "a little smooth" (setting ST2 in the Table).

When "photograph" is set in the printer driver at step S103, blue noise adding selection is set as "a little smooth" at step S104 (setting ST2 in the Table).

When "graph" is set in the printer driver at step S105, blue noise adding selection is set as "a little strong" at step S106 (setting ST4 in the Table).

When "character" is set in the printer driver at step S107, blue noise adding selection is set as "medium" at step S108 (setting ST3 in the Table). In the other settings at step S109, blue noise adding selection is set as "a little strong" at step S109 (setting ST4 in the Table).

Figure 33B:
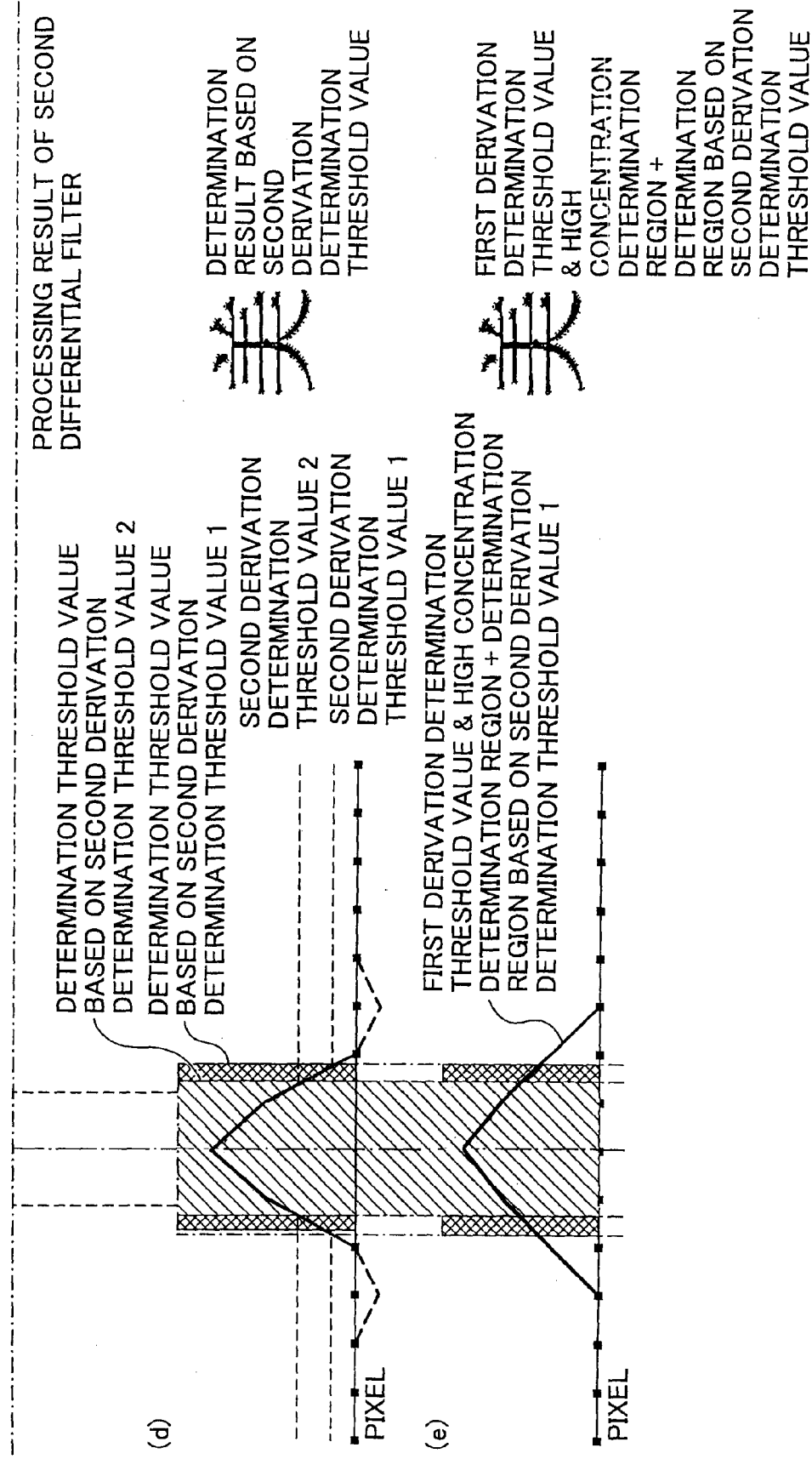
Figure 34:
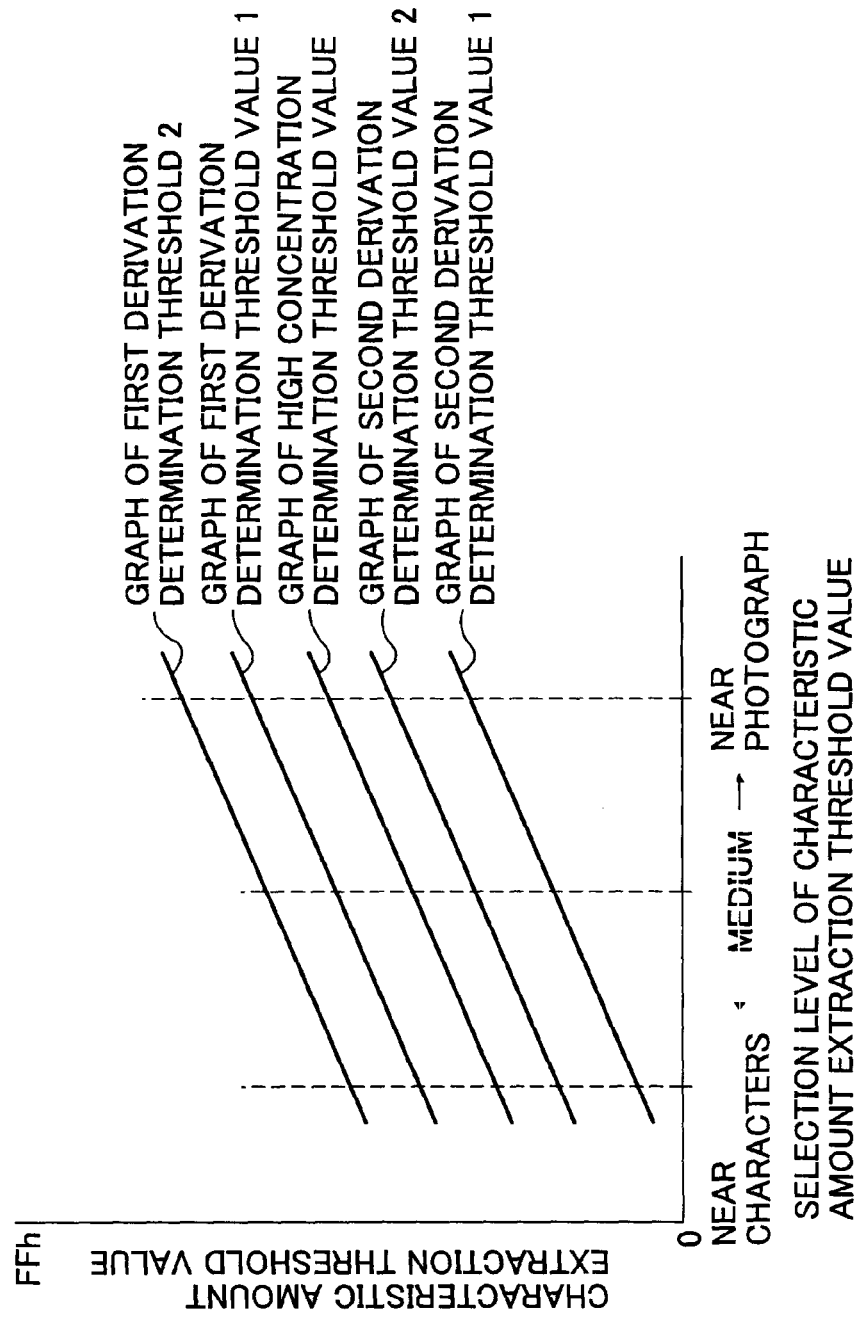
FIG. 34 is a graph for explaining exemplary selection levels of characteristic amount extraction threshold values.

As shown in FIG. 33, based on a high concentration threshold value, a first derivation characteristic amount extraction threshold value 1, a first derivation characteristic amount extraction threshold value 2, a second derivation characteristic amount extraction threshold value 1, a second derivation characteristic amount extraction threshold value 2, a region determined as a character region (a hatched portion in the drawing) can be controlled. For example, any threshold value is set as low to increase a region determined as a character (FIG. 34).

The region that is determined a weak edge portion is a region in which "a determined region based on (a first derivation determination threshold value 2 & a high concentration determination region+a second derivation determination threshold value 2)" is subtracted from "a determined region based on (a first derivation determination threshold value 1 & a high concentration determination region+a second derivation determination threshold value 1)".

Figure 35:
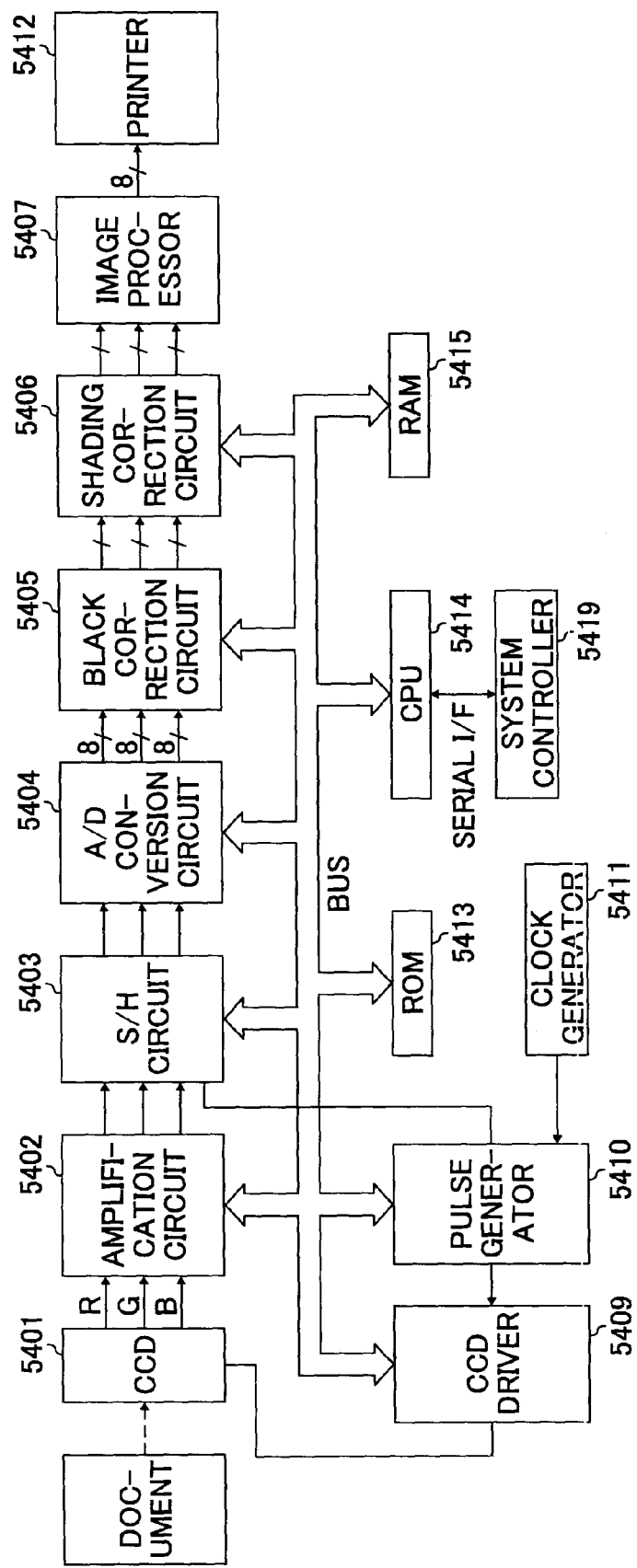
FIG. 35 is a block diagram of an image reading system.

An image reading system is explained based on a block diagram in FIG. 35.

Figure 36:
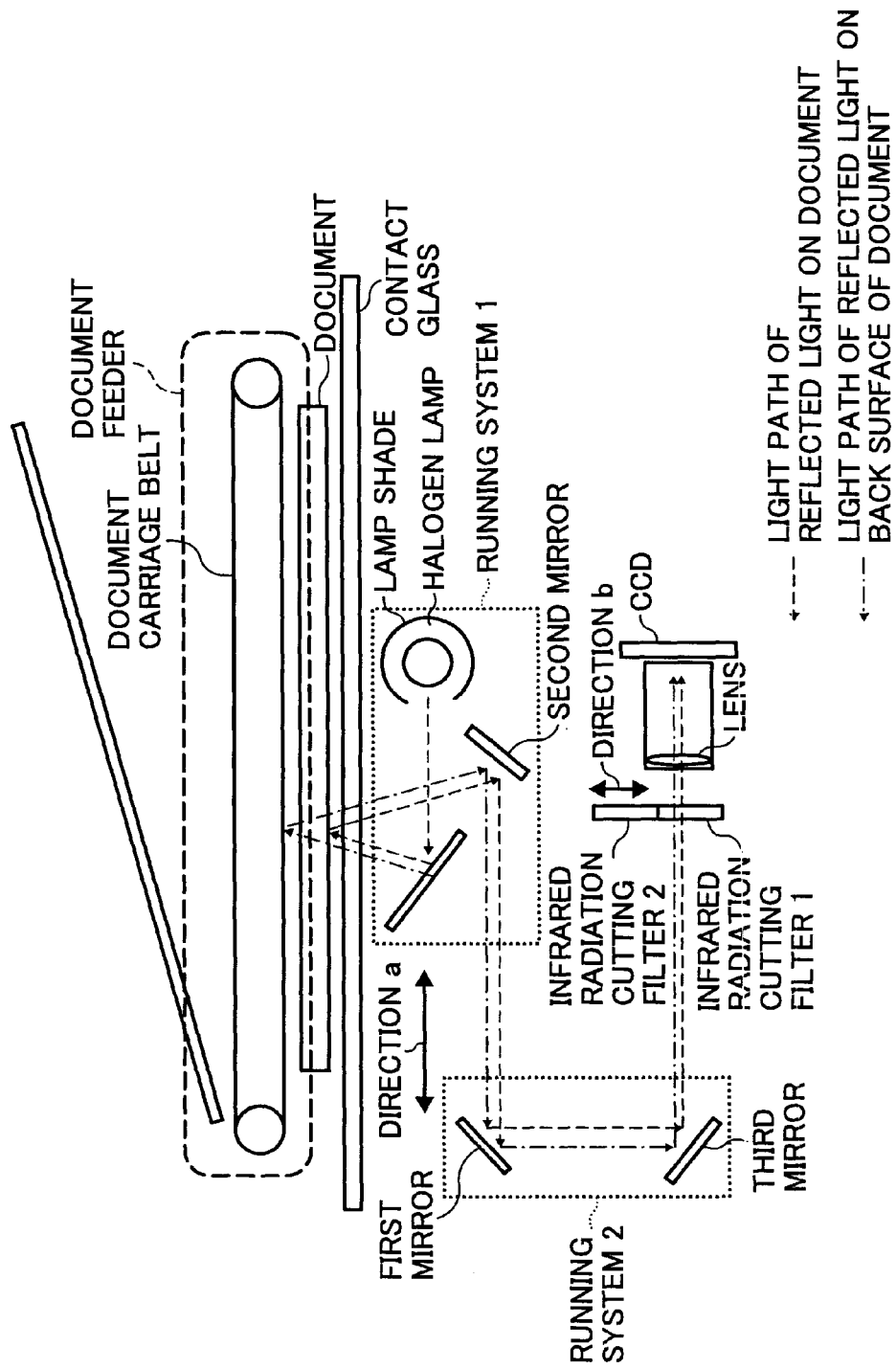
FIG. 36 is an exemplary schematic view of a scanner optical system.

Light is emitted to a document by an exposure lamp in FIG. 36. The reflected light is color-separated and read through a RGB filter in CCD 5401 and amplified to a certain level by an amplification circuit 5402.

A CCD driver 5409 supplies pulse signals to drive the CCD 5401. A pulse source required to drive the CCD driver 5409 is generated in a pulse generator 5410 and the pulse generator 5410 regards a clock generator 5411 that includes a crystal oscillator as a reference signal.

The pulse generator 5410 supplies timing needed for an S/H (sample hold) circuit 5403 to sample-hold signals from the CCD 5401. Analog color image signals sample-held by the S/H circuit 5403 are digitized as an 8-bit signal (as an example) through an A/D conversion circuit.

A black correction circuit 5405 reduces variation of a black level (electric signals in a small amount of light beams) among chips in the CCD 5401 and among pixels and prevents streaks or unevenness in black part of an image. A shading correction circuit 5406 corrects white level (electric signals in a large amount of light). Based on white data, when the scanner is moved to a position of a uniform white version, to which light is emitted, white level corrects variation in sensitivity of an irradiation system, an optical system, and the CCD 5401.

Figure 37:
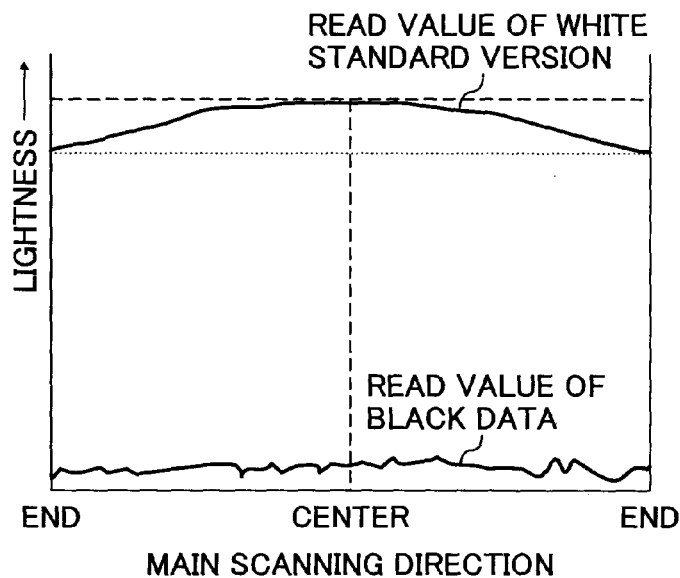
FIG. 37 is a conceptual view of image signals for white correction/black correction.

FIG. 37 is a conceptual view of image signals for white correction/black correction.

Signals from the shading correction circuit 5406 are processed by an image processor 5407 and are output through a printer 5412. The circuit is controlled by a CPU 5414 and data required to control is stored in ROM 5413 and RAM 5415.

The CPU 5414 communicates with a system controller 5419 that controls the whole image forming apparatus through a serial I/F. The CPU 5414 controls a scanner driving device (not shown) and drives and controls the scanner 121.

An amount of amplification in the amplification circuit 5402 is determined to make an output value of the A/D conversion circuit 5404 be a desired value with respect to certain document concentration. As an example, a document concentration of 0.05 in normal copying (a reflectivity of 0.891) is provided as a 240 value based on an 8-bit signal value. On the other hand, in shading correction, an amplification factor is decreased and shading correction sensitivity is increased.

This is because image signals enough to be more than a 255 value based on an 8-bit signal, which reach a level of saturation of a 255 value, cause an error in shading correction in consideration of an amplification factor in normal copying when there are a lot of reflected light.

Figure 38:
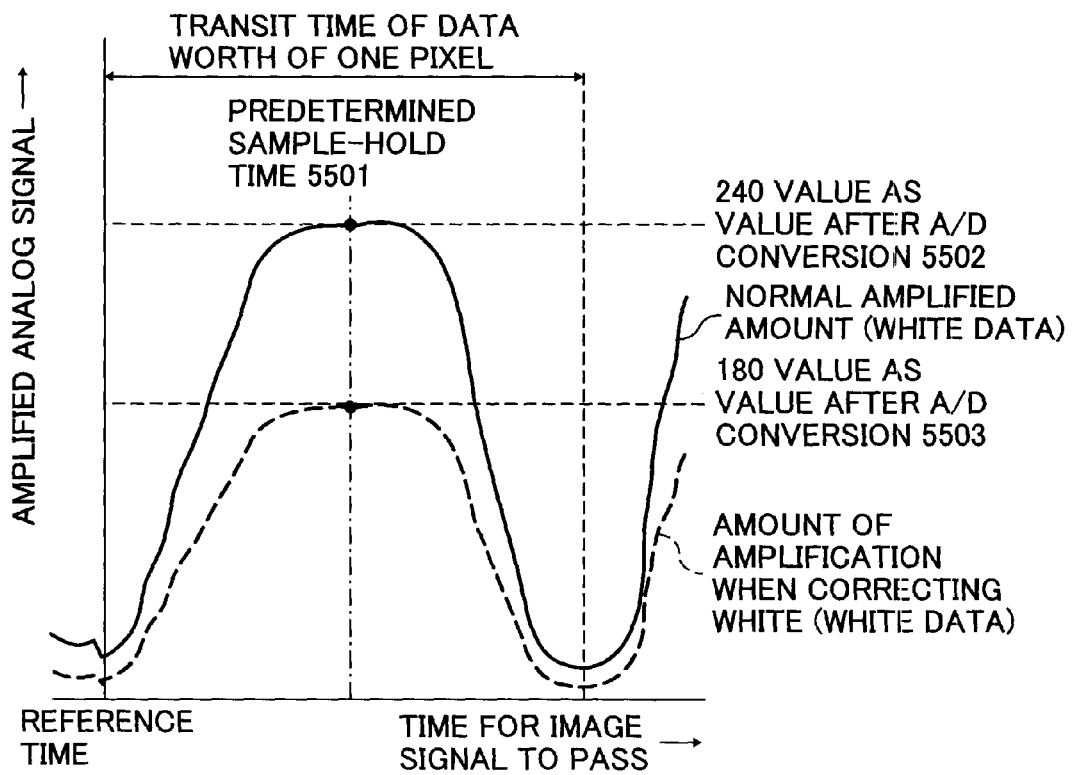
FIG. 38 is a schematic view for explaining how image reading signals amplified in an amplification circuit 5402 are sample-held in an S/H circuit 5403.

FIG. 38 is a schematic view for explaining how image reading signals amplified in the amplification circuit 5402 are sample-held in the S/H circuit 5403. A horizontal axis represents time during which amplified analog image signals pass the S/H circuit 5403. A vertical axis represents a value of an amplified analog signal. Analog signals are sample-held in a predetermined sample-hold time 5501 to transmit them to the A/D conversion circuit 5404.

In FIG. 38, with regard to image signals that read the white level, amplified image signals 5502 and 5503, while copying, have a 240 value as a value after A/D conversion and a 180 value in white correction, as an example, respectively.

According to an aspect of the present invention, therefore, it is advantageous to prevent texture and to reduce a feeling of being uneven with regard to image data on which random dither processing is performed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
   a random dither processing unit that performs random dither processing of converting input N-values image data to M-values image data;
   a non-transitory memory configured to store the input N-values image data;
   a flag setting unit that sets a flag that designates an addition of a non-periodic component to each of quantization threshold values;
   a threshold-value adding unit that adds a non-periodic component to the quantization threshold values based on a magnitude of the quantization threshold values in different threshold value levels with respect to a target pixel in the quantization threshold values; and a controlling unit that determines whether the threshold-value adding unit is to add the non-periodic component, wherein the controlling unit determines whether the threshold-value adding unit is to add the non-periodic component depending on whether the magnitude of the quantization threshold values that correspond to different threshold value levels in the target pixel satisfies a predetermined relation.

2. The image forming apparatus according to claim 1, wherein the controlling unit determines that the threshold-value adding unit is not to add the non-periodic component when the magnitude of the quantization threshold value that correspond to different threshold value levels in the target pixel satisfies a predetermined relation.

3. The image forming apparatus according to claim 1, wherein the threshold value that has a non-periodic component is a blue noise table.

4. An image forming apparatus, comprising:
a random dither processing unit that performs random dither processing of converting input N-values image data to M-values image data;
a non-transitory memory configured to store the input N-values image data;
a flag setting unit that sets a flag that designates an addition of a non-periodic component to each of quantization threshold values; and
a threshold-value adding unit that adds a non-periodic component to the quantization threshold values based on a magnitude of the quantization threshold values in different threshold value levels with respect to a target pixel in the quantization threshold values,
wherein, with respect to a quantization threshold value that periodically changes, a threshold value that has a non-periodic component is added to the quantization threshold value in pixels that form a core of a predetermined dither, while a threshold value that has a non-periodic component is not added to the quantization threshold value in the other pixels.

5. The image forming apparatus of claim 4, wherein the threshold value that has a non-periodic component is a blue noise table.

6. An image forming apparatus, comprising:
a random dither processing unit that performs random dither processing of converting input N-values image data to M-values image data;
a non-transitory memory configured to store the input N-values image data;
a flag setting unit that sets a flag that designates an addition of a non-periodic component to each of quantization threshold values;
a threshold-value adding unit that adds a non-periodic component to the quantization threshold values based on a magnitude of the quantization threshold values in different threshold value levels with respect to a target pixel in the quantization threshold values; and
an input unit that receives input of information from a user that indicates whether a threshold value that has a non-periodic component is to be added to the quantization threshold values.

7. The image forming apparatus of claim 6, wherein the threshold value that has a non-periodic component is a blue noise table.

8. An image forming apparatus, comprising:
a random dither processing unit that performs random dither processing of converting input N-values image data to M-values image data;
a non-transitory memory configured to store the input N-values image data;
a flag setting unit that sets a flag that designates an addition of a non-periodic component to each of quantization threshold values; and
a threshold-value adding unit that adds a non-periodic component to the quantization threshold values based on a magnitude of the quantization threshold values in different threshold value levels with respect to a target pixel in the quantization threshold values,
wherein a value to set whether a threshold value that has a non-periodic component is added to the quantization threshold values is switched by an input device of image data.

9. The image forming apparatus of claim 8, wherein the threshold value that has a non-periodic component is a blue noise table.

* * * * *